US011173663B2

(12) United States Patent
Cook et al.

(10) Patent No.: US 11,173,663 B2
(45) Date of Patent: Nov. 16, 2021

(54) THREE-DIMENSIONAL PRINTING TECHNOLOGY

(71) Applicant: X Material Solutions, LLC, Andover, MA (US)

(72) Inventors: Norman Joseph Cook, Andover, MS (US); Roger Alan Peck, Washington, NC (US); David Zisskind, Narragansett, RI (US)

(73) Assignee: X MATERIAL SOLUTIONS, INC., Andover, MA (US)

( * ) Notice: Subject to any disclaimer, the term of this patent is extended or adjusted under 35 U.S.C. 154(b) by 0 days.

(21) Appl. No.: 17/073,004

(22) Filed: Oct. 16, 2020

(65) Prior Publication Data

US 2021/0114303 A1 Apr. 22, 2021

Related U.S. Application Data

(60) Provisional application No. 62/981,395, filed on Feb. 25, 2020, provisional application No. 62/916,647, filed on Oct. 17, 2019.

(51) Int. Cl.
| | |
|---|---|
| *B29C 64/336* | (2017.01) |
| *B29C 64/209* | (2017.01) |
| *B29C 64/106* | (2017.01) |
| *B33Y 30/00* | (2015.01) |

(Continued)

(52) U.S. Cl.
CPC .......... *B29C 64/336* (2017.08); *B29C 64/106* (2017.08); *B29C 64/209* (2017.08); *B29L 2031/3462* (2013.01); *B33Y 30/00* (2014.12); *B33Y 80/00* (2014.12)

(58) Field of Classification Search
CPC .... B29C 64/336; B29C 64/209; B29C 64/106
See application file for complete search history.

(56) References Cited

U.S. PATENT DOCUMENTS

| | | |
|---|---|---|
| 7,153,454 B2 | 12/2006 | Khoshnevis |
| 7,452,196 B2 | 11/2008 | Khoshnevis |
| 7,641,461 B2 | 1/2010 | Khoshnevis |

(Continued)

FOREIGN PATENT DOCUMENTS

| | | |
|---|---|---|
| AT | 550169 T | 4/2012 |
| EP | 1587995 A2 | 10/2005 |

(Continued)

OTHER PUBLICATIONS

Partial International Search Report and Written Opinion issued in corresponding Application No. PCT/US2020/055996, dated Feb. 16, 2021, 15 pages.

*Primary Examiner* — Michael M. Robinson
(74) *Attorney, Agent, or Firm* — Rothwell, Figg, Ernst & Manbeck, P.C.

(57) ABSTRACT

A three-dimensionally printed structure is provided. The three-dimensionally printed structure includes a first layer composed at least in part of a first material; a second layer composed at least in part of the first material, the second layer being positioned over, under, or through the first layer and having an interface with the first layer; and a first internal structure composed at least in part of a second material different from the first material, the first internal structure being situated in both the first layer and the second layer.

7 Claims, 16 Drawing Sheets

(51) Int. Cl.
*B33Y 80/00* (2015.01)
*B29L 31/34* (2006.01)

(56) References Cited

U.S. PATENT DOCUMENTS

| | | |
|---|---|---|
| 7,837,378 B2 | 11/2010 | Khoshnevis |
| 8,029,258 B2 | 10/2011 | Khoshnevis |
| 8,518,308 B2 | 8/2013 | Khoshnevis |
| 8,778,252 B2 | 7/2014 | Mackie |
| 9,339,972 B2 | 5/2016 | Gordon |
| 9,701,064 B2 | 7/2017 | Donaldson |
| 10,119,108 B2 | 11/2018 | Maggiore |
| 10,254,499 B1 * | 4/2019 | Cohen ............... B23K 1/19 |
| 10,456,977 B2 | 10/2019 | Talgorn |
| 2004/0164436 A1 | 8/2004 | Khoshnevis |
| 2005/0194401 A1 | 9/2005 | Khoshnevis |
| 2005/0196482 A1 | 9/2005 | Khoshnevis |
| 2005/0196484 A1 | 9/2005 | Khoshnevis |
| 2009/0043424 A1 | 2/2009 | Khoshnevis |
| 2010/0318222 A1 | 12/2010 | Khoshnevis |
| 2012/0038074 A1 | 2/2012 | Khoshnevis |
| 2015/0174824 A1 | 6/2015 | Gifford |
| 2016/0067740 A1 | 3/2016 | Voris |
| 2016/0136887 A1 * | 5/2016 | Guillemette .......... B29C 64/106 428/375 |
| 2017/0120519 A1 | 5/2017 | Mark |
| 2017/0203468 A1 * | 7/2017 | Sherman ................. E04C 5/00 |
| 2018/0036972 A1 | 2/2018 | Talgorn |
| 2018/0250850 A1 | 9/2018 | Che-Iun-Tai |
| 2018/0370133 A1 | 12/2018 | Provencher |
| 2019/0134889 A1 * | 5/2019 | Roman ................ B29C 64/255 |

FOREIGN PATENT DOCUMENTS

| | | |
|---|---|---|
| EP | 1587995 A4 | 9/2009 |
| EP | 1587995 B1 | 3/2012 |
| HK | 1082280 A1 | 6/2006 |
| JP | 2006515908 A | 6/2006 |
| JP | 4527107 B2 | 8/2010 |
| MX | PA05007778 A | 1/2006 |
| WO | 2004065707 A2 | 8/2004 |
| WO | 2004065707 A3 | 10/2004 |
| WO | 2018015920 A1 | 1/2018 |

\* cited by examiner

THREE-DIMENSIONAL PRINTING TECHNOLOGY

CROSS-REFERENCE TO RELATED APPLICATIONS

This application claims priority to, and benefit of, U.S. Provisional Application Nos. 62/981,395, filed Feb. 25, 2020, and 62/916,647, filed Oct. 17, 2019, the contents of which are incorporated herein in their entirety.

TECHNICAL FIELD

Disclosed are embodiments related to improved three-dimensional printing technology.

BACKGROUND

The current art of three-dimensional printing is an additive process of layering materials (e.g. metal, plastic, concrete).

SUMMARY

One problem with the current art is that the additive process of layering materials (known in the three-dimensional printing industry as "additive") does not provide for significant structural stability (e.g., including internal structural rigidity and/or stability) with regard to a myriad of applications. For example, where the material (or additive) being layered is a cement, or a mixture of concrete or other substances, the lack of overlap in area (see FIG. 5 at 504) results in cold joints bonding adjacent layers. This can result in a layered stack of weak linear joints with little or no lateral support.

For example, FIG. 5 illustrates a typical three-dimensional printed structure. Rows 502 of material (or additive) are laid down, one on top of another. There may be some overlap area 504, where the rows 502 may bond to one another. The bonds in the overlap area 504 may, for example, vary based on the amount of chemical content (e.g., $H_2O$ content), and will cause failure points in a three-dimensional printed structure. Similar issues result with other materials such as plastic. Layering plastic like this may result in some chemical bonds between the layers, but the current art does not result in cross-linked structures that provide mechanical stability.

Three-dimensionally printed structures, according to the current art, also lack the necessary cohesion to provide dynamic protection (e.g., ballistic protection) and protection against other stresses and forces that may be applied to the structures (e.g. earthquakes, impacts into the structure, lateral stress, flooding, and other such stresses and forces).

These problems can occur, for instance, in cement nesting or fabric bonding type applications.

Accordingly, there is a need for three-dimensional printed structures, and processes for making them, that provide internal structural stability (such as, but not limited to, cross-linking and material application) and/or dynamic (e.g., ballistic or marine) or other protection provided by the combination of a variety of materials being combined to form an additive layer. The three-dimensional printing process also provides the advantage of rapid construction of such structures and articles.

Advantages of embodiments disclosed herein include: improved adhesion between layers, improved overall strength and/or flexibility of three-dimensionally printed structures, improved efficiencies in material usage (e.g. up to 30% less material (in the case of cementacious materials as described herein) needed for certain structures and the combination of two or more materials in a variety of states (e.g., gas, liquid, solid) being combined as a single additive layer). Additionally, combining materials may lead to improved dynamics in the additive dispensation process. Embodiments provide for a wide variety of improved performance characteristics, including, but not limited to: increased flexibility, thermal resistance, diminished heating/cooling, reduced mass, increased strength, and shrapnel/blast resistance. These improvements may result from a combination of material choice and placement. Placement may happen at the time of dispensation of additive materials that may be linked to previous layers or be prepared for cross-linkage with subsequent layers. The process may include a wrap, a stitch, a forming to accommodate shape, or an insertion. Materials can include solid, liquid, and gaseous state materials. In order to facilitate the process, a head or nozzle may be able to accommodate other heads or nozzles within or alongside it, as well as applicators for materials such as fabrics, mesh, threads, cables, and aggregates.

According to a first aspect, a three-dimensionally printed structure is provided. The three-dimensionally printed structure includes a first layer composed at least in part of a first material; a second layer composed at least in part of the first material, the second layer being positioned over, under, or through the first layer and having an interface with the first layer; a first internal structure composed at least in part of a second material different from the first material, the first internal structure being situated in both the first layer and the second layer.

In some embodiments (e.g., as shown in FIG. 16), the first internal structure is further composed of additional materials different from the second material. In some embodiments, the first internal structure has a shape that is one of: a flat shape, a curved shape, an inverted "T" shape, an "H" shape. In some embodiments, the three-dimensionally printed structure further includes a second internal structure composed at least in part of the second material different from the first material, the second internal structure being situated in both the first layer and the second layer. In some embodiments, the second internal structure and the first internal structure overlap. In some embodiments, the second internal structure and the first internal structure do not overlap. In some embodiments, the three-dimensionally printed structure further includes additional layers composed at least in part of the first material and being stacked over the first and second layers; and additional internal structures composed at least in part of the second material different from the first material, each of the additional internal structures being situated in two or more layers selected from one or more of the additional layers and the first and second layers. In some embodiments, each layer of the additional layers includes one of the additional internal structures is situated in the layer. In some embodiments, at least one layer of the additional layers does not include one of the additional internal structures situated in the at least one layer.

In some embodiments, the first layer comprises wires or cables suitable for communication. In some embodiments, the first layer comprises a continuous embedment. In some embodiments, the continuous embedment is for reinforcement of the first layer. In some embodiments, the continuous embedment comprises fiber strands.

According to a second aspect, an applicator for printing a three-dimensionally printed structure is provided. The applicator includes: a nozzle head having first and second areas for extruding a first material; the nozzle head further having a tube for feeding a second material, such that the second material that is fed through the tube forms an internal structure to the first material.

In some embodiments, the tube has a shape that is one of: a flat shape, a curved shape, an inverted "T" shape, an "H" shape. In some embodiments, the tube for feeding the second material is located between the first and second areas.

According to a third aspect, a method for printing a three-dimensionally printed structure is provided. The method includes: laying down one or more layers of material, wherein laying down a layer comprises (i) extruding a first material through first and second areas of a nozzle head; and (ii) feeding a second material through a tube of the nozzle head, wherein the second material forms an internal structure to the first material.

In some embodiments, the tube has a shape that is one of: a flat shape, a curved shape, an inverted "T" shape, an "H" shape.

According to a fourth aspect, a three-dimensionally printed structure is provided. The three-dimensionally printed structure includes: a first layer having first and second columns composed at least in part of a first material with a second material being interspersed between the first and second columns of the first layer; a second layer having first and second columns composed at least in part of the first material with the second material being interspersed between the first and second columns of the second layer, the second layer being positioned over the first layer and having an interface with the first layer; a mesh structure extending between the first layer and the second layer and from the first column to the second column.

In some embodiments, the mesh structure extends along sides of the first and second column. In some embodiments, the first material comprises concrete, the second material comprises a foam, and the mesh structure comprises a metal.

According to a fifth aspect, an applicator for printing a three-dimensionally printed structure is provided. The applicator includes: a nozzle system having first, second, and third tubes, the first and second tubes being configured to emit a first material and the third tube being configured to emit a second material; a mesh dispenser; and a roller for flattening out mesh material dispensed by the mesh dispenser.

In some embodiments, the first and second tubes bifurcate from a common tube, and wherein the third tube is positioned in between the first and second tubes such that the second material is configured to be emitted between the first material. In some embodiments, the mesh dispenser includes a roll of mesh material that is configured to unroll as the nozzle system is moved in a direction of printing/extruding along a printing surface. In some embodiments, the roller is configured to fold the mesh material as it is dispensed.

According to a sixth aspect, a method for printing a three-dimensionally printed structure is provided. The method includes: laying down one or more layers of material, wherein laying down a layer comprises (i) extruding a first material through first and second areas of a nozzle head; and (ii) feeding a second material through a tube of the nozzle head, wherein the second material forms an internal structure to the first material.

According to a seventh aspect, a three-dimensionally printed structure is provided. The three-dimensionally printed structure includes: a first layer comprising a first expandable sock filled with a first material; and a second layer comprising a second expandable sock filled with the first material, the second layer being positioned over the first layer and having an interface with the first layer.

According to an eighth aspect, an applicator for printing a three-dimensionally printed structure is provided. The applicator includes: an expandable sock dispenser for dispensing an expandable sock to be filled with a first material; and a nozzle configured to fill expandable socks dispensed by the expandable sock dispenser.

According to a ninth aspect, a method for printing a three-dimensionally printed structure is provided. The method includes: applying a first layer comprising a first expandable sock filled with a first material; and applying a second layer comprising a second expandable sock filled with the first material, the second layer being positioned over the first layer and having an interface with the first layer.

According to a tenth aspect, a system for printing a three-dimensionally printed structure is provided. The system includes: a printing device having a base, an arm, and an applicator; a material supply coupled to the printing device; wherein the arm is capable of moving the applicator, and wherein the applicator is an applicator according to any one of the embodiments according to the second, fifth, and eighth aspects.

BRIEF DESCRIPTION OF THE DRAWINGS

The accompanying drawings, which are incorporated herein and form part of the specification, illustrate various embodiments.

DETAILED DESCRIPTION

Figure 1:
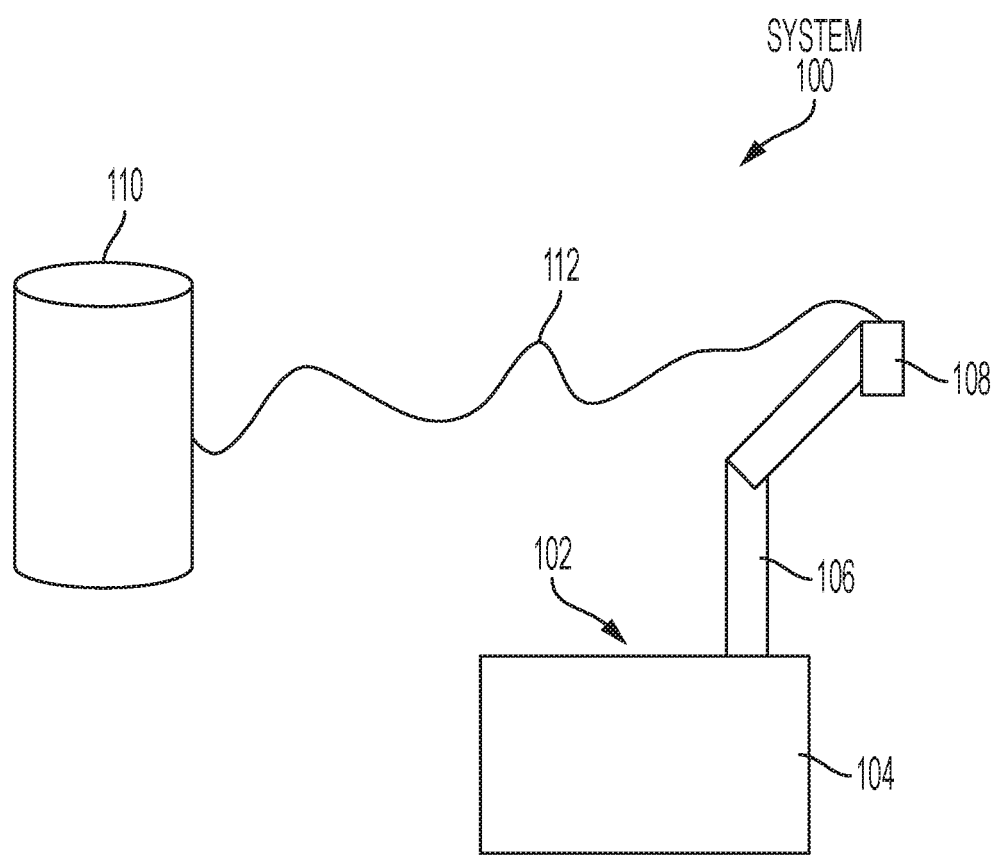
FIG. 1 illustrates a three dimensional printing system according to one embodiment of the present invention.

FIG. 1 illustrates a system 100 for three-dimensional printing. System 100 may include a printing device 102 and a material supply 110. Printing device 102 may include a base 104, an arm or gantry 106, and an applicator 108. Printing device 102 and material supply 110 may be coupled by a link or links 112. For example, link or links 112 may couple the material supply 110 to the applicator 108, so that applicator 108 may apply material to a surface and thereby construct a three-dimensional printed structure. Base 104 may be in the form of a gantry or a foot and in some embodiments may be mobile or fixed, depending on the needs of a particular application. Base 104 may be coupled to arm or arms 106. Arm or arms 106 may be a fixed arm, or may be an articulated arm, such that arm 106 is capable of moving applicator 108 to a particular position where applicator(s) 108 may apply material to a surface. Applicator 108 may take the form of any of the applicators discussed herein. Cartridges or magazines supplying reinforcements may be attached to device 102. Such reinforcements may include metal, plastic, and fabric reinforcements, such as mesh, staples, or fabrics.

Printing device 102 works by printing multiple layers of material (or materials), such that one layer is printed over another. Through this process, complex articles and structures can be created. The layers of material that are printed can include any of a number of materials, or a combination, blend, or union of such materials, without limitation including curing agents, polymers, resins, fabrics, metals, concrete, and mixtures thereof. Printing device 102 may print any shape of object, including but not limited to: in the dimensions of a Concrete Masonry Unit (CMU) or any free standing requirements whether large or small.

When printing overhang structures, for example, temporary support arms may be created to support the overhang projections. To support this, gas may be inserted into additive applications to create bubbles, or inflated tubes, that support subsequent additive applications over the bubbles, or tubes. The gas may be inserted by inserting a needle (attached to applicator 108) into the material being printed.

Figure 2A:
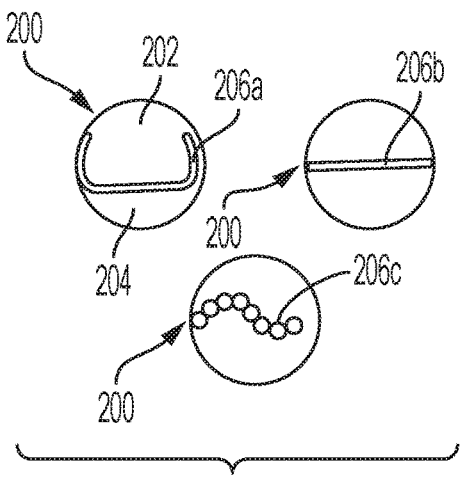
FIG. 2A illustrates another aspect of the present invention, including exemplary material placement designs and additive with imbedded internal structures and strands.

FIGS. 2A-2E illustrate an embodiment of an applicator 108 and the type of three-dimensional printed structure such an applicator 108 may construct. As shown in FIG. 2A, applicator 108 may include a nozzle head 200. Nozzle head 200 may include one or more of areas 202, 204 where a first material is extruded, and a tube 206a, 206b, 206c where a second (or additional) material is fed through. The nozzle head 200 may have a single tube 206a, 206b, 206c, or may include multiple tubes 206a, 206b, 206c, with each tube having its own housing, and the combination of tubes having a separate housing. There may be one material, two materials, or a multitude of different materials through the different tubes. The tube 206a, 206b, 206c may be a "tape" or strand, meaning that the material as it is fed through the tube may have a tape-like condition or a thread-like condition.

The shape of the tube (or combination of tubes forming nozzle head 200) may vary, for example, the shape may be bent inward at the edges (206a), flat (206b), or curved (206c). Other shapes (e.g., such as an "L" shape, or an inverted "T", "H", or chevron shapes) are also possible. In some embodiments, the particular shape of the tube (or combination of tubes) may depend on the application (e.g. desired strength properties), and the particular materials selected for the first material and the second material and any additional materials. This applies generally to the tubes disclosed herein, including those illustrated at 206a, 206b, 206c in FIG. 2, as well as in FIGS. 3A-4E, 4A, 7, 8, and 11. As shown, tubes 206a and 206b are shaped to accommodate tapes or strips, while tube 206c is shaped to accommodate strands of material (such as shown in FIG. 4A).

The first material may be a material of any type, and may include a material suitable for construction or production, such as but not limited to glass, ceramic, concrete, resin, metal, or plastic.

The second material that is fed through the tube (e.g., through tubes 206a, 206b, 206c, or any other tube disclosed herein) may be a material of any type, and may include a material suitable for providing an internal support structure, such as but not limited to a foamed material (e.g., autoclaved aerated concrete, or AirCrete). The material may be in any one state (e.g., liquid, gas, or solid).

In some embodiments, the second material (and any additional materials) is different from the first material.

As used herein, the terms "tube" and "nozzle" may be interchangeable.

Figure 2B:
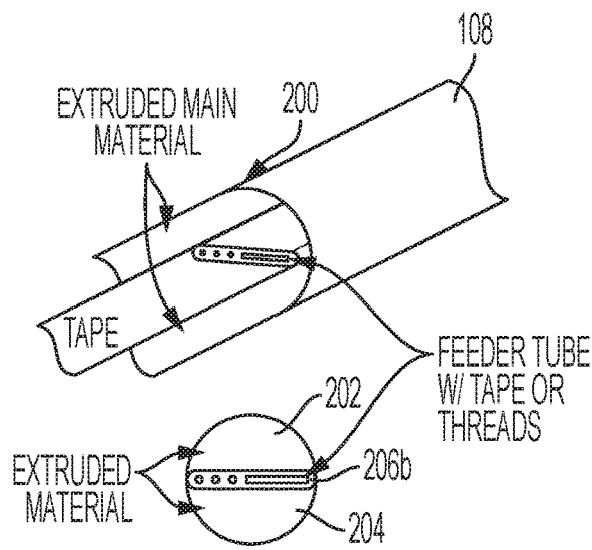
FIG. 2B illustrates another aspect of the present invention, including an exemplary nozzle head design.

FIG. 2B illustrates an example of the nozzle head 200 housing a flat tube shape similar to 206b. As shown, when applicator 108 fitted with nozzle head 200 applies material to a surface, extruded first material surrounds the tube of second material emanating from tube 206b and any additional tubes housed within nozzle head 200.

Figure 2C:
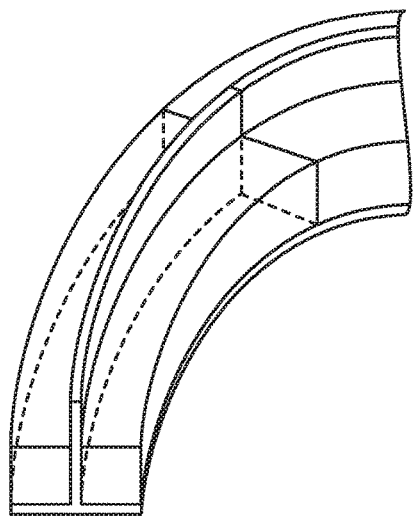
FIG. 2C illustrates another aspect of the present invention, including an exemplary nozzle head design, showing a nozzle head within a nozzle head capable of providing a feed of strands, tapes, and other structurally augmenting materials within the additive body.

FIG. 2C illustrates an example of the nozzle head 200 housing an upside-down T-shaped tube designed to extrude/excrete/expel an "L" or "T" shaped beam or rigid article, with or without additional material. As shown, when applicator 108 fitted with nozzle head 200 applies material to a surface, extruded first material surrounds the tube of second material emanating from the tube and any additional tubes housed within nozzle head 200.

Figure 2D:
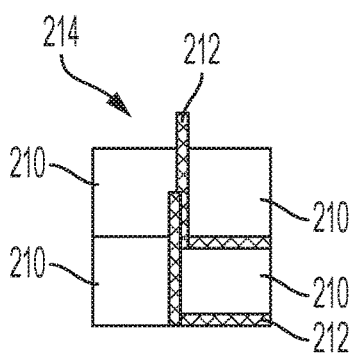
FIG. 2D illustrates another aspect of the present invention including an exemplary three-dimensionally printed structure.

FIG. 2D illustrates a schematic cross-sectional view of extruded first material layer sitting under a second material layer. Both layers have been embedded with an "L" shaped rigid beam or rigid article that extends into any material layer subsequently deposited, creating a mechanical connection. In embodiments, other shapes (besides an "L" shape) may also be employed. As shown, there are two layers of extruded first material 210. For a given layer of extruded first material 210, there is an internal structure 212 created by the tube of second material. In this example, internal structure 212 has the shape of an "L" shaped bracket, which extends into the layer immediately above it. The combination of different layers of the extruded first material 210 and the internal structure 212 form the three-dimensionally printed structure 214. The internal structure 212 may provide additional structural support for the three-dimensionally printed structure 214. As shown, an internal structure 212 is present in each of the layers shown. In some embodiments, the tube of second material may be applied selectively to some layers and not others, depending on a particular design of the three-dimensionally printed structure 214. For example, in some embodiments there may be some layers with no overlap of internal structures 212. An overlap provides a direct structural attachment of two layers, e.g. facilitated by a beam or rigid structure that intrudes from one layer into another layer. Some layers may not need this specific connection type, or may require a different material or shape based on performance needs. For example, some layers may require a flush finish (e.g., a top-most layer), and since an "L" beam may protrude, such a layer may not include a beam.

Figure 2E:
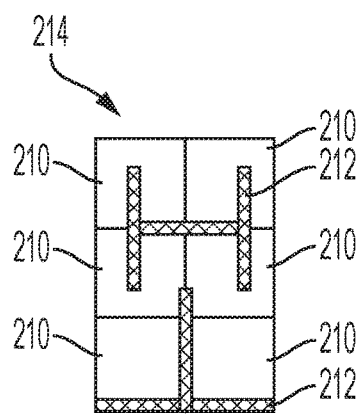
FIG. 2E illustrates another aspect of the present invention including an exemplary three-dimensionally printed structure.

FIG. 2E illustrates a similar schematic cross-sectional view as shown in FIG. 2D. In FIG. 2E, there are three layers of extruded first material 210. The first layer of extruded first material 210 includes a first internal structure 212 that has the shape of an inverted "T", which extends into the layer immediately above it. The third layer of extruded first material 210 includes a second internal structure 212 that has the shape of an "H", which extends into the layers immediately above and below it. As shown, the design of the internal structures 212 may be chosen so that there is no overlap of internal structures 212. In some embodiments, a nozzle head 200 may be able to accommodate different internal nozzle shapes such as tube 206a, 206b, 206c. In some embodiments, applicator 108 may be able to switch between different nozzles 200. In some embodiments, printing device 102 may be able to switch between or possess multiple iterations of different applicators 108 attached to one or more arms 106. For example, one type of tube (or nozzle or applicator, or a combination of a plurality of tubes, nozzles, or applicators) may be used in laying the first layer and another type of tube (or nozzle or applicator, or a combination of a plurality of tubes, nozzles, or applicators) may be used in laying the third layer (or subsequent layers). As noted above, in some embodiments, the tube of second material may be applied selectively to some layers and not others, depending on a particular design of the three-dimensionally printed structure 214.

The applicator 108 may lay down any type of material, including but not limited to material that may be extruded, unrolled, laminated, inserted, and punctured. The consideration of particular material combinations, therefore, depends largely on the application (e.g., the nature of the structure being created). Additionally, because the material may be in different directions (as in FIG. 4B, materials can be imbedded not only laterally, but horizontally and vertically through insertion at multiple angles of insertion or injection), the direction of embedding may also be a factor in material choice. For example, concrete may be embedded with vertically oriented staples of rebar or Kevlar, and horizontal strands of barbed wire or Kevlar strands, or wrapped in a variety of meshes.

Figure 3A:
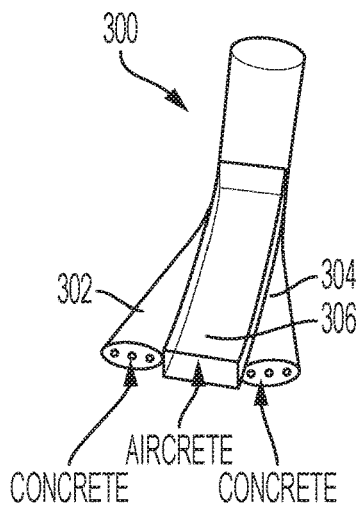
FIG. 3A illustrates another aspect of the present invention including an exemplary nozzle head design.
Figure 3B:
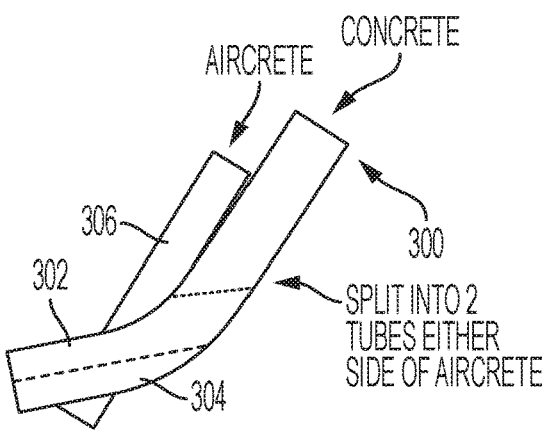
FIG. 3B illustrates another aspect of the present invention including an exemplary nozzle head design.

FIGS. 3A-3E illustrate another embodiment of an applicator 108 and the type of three-dimensional printed structure such an applicator 108 may construct. As shown in FIGS. 3A and 3B, nozzle system 300 may include first and second tubes 302, 304 for emitting a first material, and a third tube 306 for emitting a second material (and, in some embodiments, additional materials). The third tube 306 may be positioned in between the first and second tubes 302, 304. For example, the first and second tubes 302, 304 may be part of a single tube that is split into two at a junction point. In some embodiments, tubes 302 and 304 may be configured to emit a different material. In some embodiments, the first material and the second material (and any additional materials) may be any of the first material and second material identified for the embodiment described above with respect to FIGS. 2A-2E. Note that tubes 302, 304, and 306 are illustrative, and any other number or type of tubes may be used by applicator 108. For example, there may be fewer or more tubes, such as four tubes, or five tubes, where each tube may emit a same or different type of material as each other tube, and the tubes may be located in different arrangements, e.g. one tube may be placed concentrically within another tube which may be placed concentrically within another tube, or different tubes may be adjacent to each other. Generally, for other embodiments disclosed herein, the number of tubes for a given applicator may be more or fewer than illustrated, and the tubes may be arranged in different arrangements than illustrated.

Figure 3C:
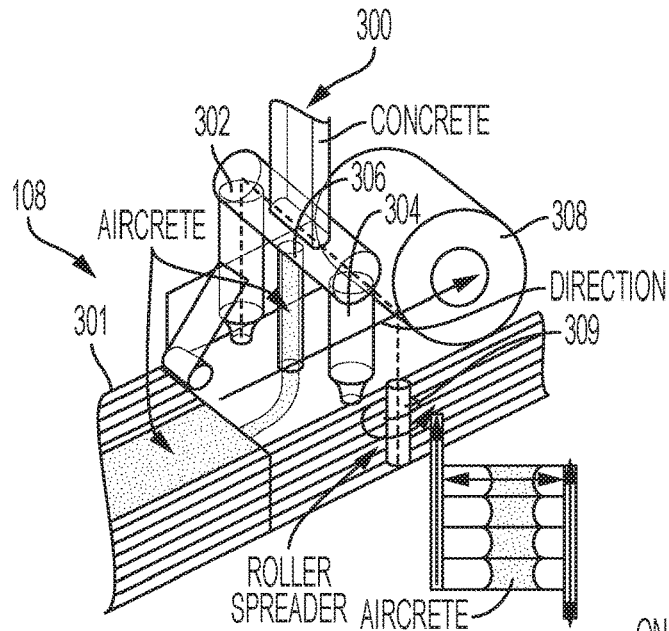
FIG. 3C illustrates another aspect of the present invention including an exemplary nozzle head design and reinforcement material dispensation technique.
Figure 4A:
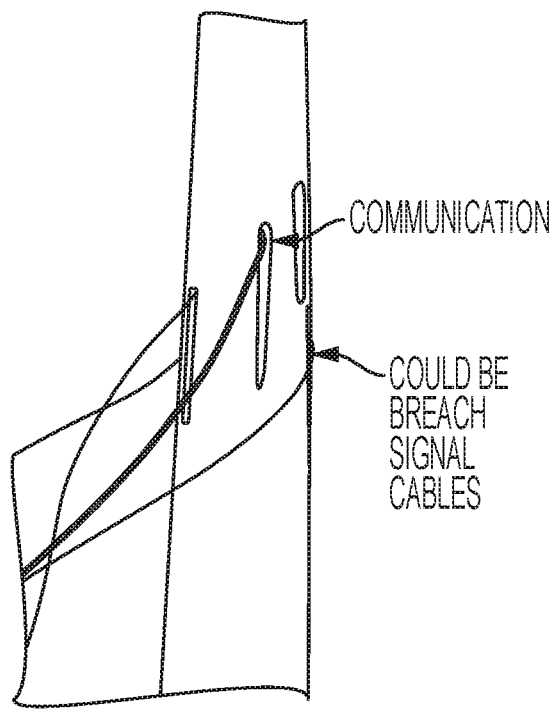
FIG. 4A illustrates another aspect of the present invention including an exemplary nozzle head design providing a feed of strands, tape, and other structurally augmenting materials within the additive body.

FIG. 3C illustrates an example applicator 108. As shown, applicator 108 includes a nozzle system 300, having first and second tubes 302, 304, and third tube 306, as described above. While third tube 306 is illustrated as a single tube, it can include multiple feeds in some embodiments. Applicator 108 also includes a mesh dispenser 308, capable of dispensing a reinforcing material (e.g., a reinforcing fabric or mesh material). As shown, mesh dispenser 308 is a magazine containing a mesh or reinforcing material 314, that is applied as nozzle system 300 moves in a direction parallel to a surface 301 that applicator 108 is applying material to. As the nozzle system 300 moves, the roll 308 of the mesh material 314 unrolls such that the mesh material 314 is applied to the layer of material being laid down. In some embodiments, the mesh or other reinforcing material 314 may be wider than the width of the layer of material being laid down, in which case the mesh or other reinforcing material 314 will extend beyond the width of the material being laid down. Applicator 108 may additionally include a roller 309. Roller 309 may be configured to fold the mesh or other reinforcing material 314 that extends beyond the width of the material being laid down such that the mesh or other reinforcing material 314 can be flush with the sides of the material. In some embodiments, applicator 108 may include a roller 309 on opposing sides such that mesh or other reinforcing material 314 extending beyond the width of the material being laid down on either side may be folded and made flush with the sides of the material. In embodiments, roller 309 may fold the material in an upward and/or downward direction.

Figure 14:
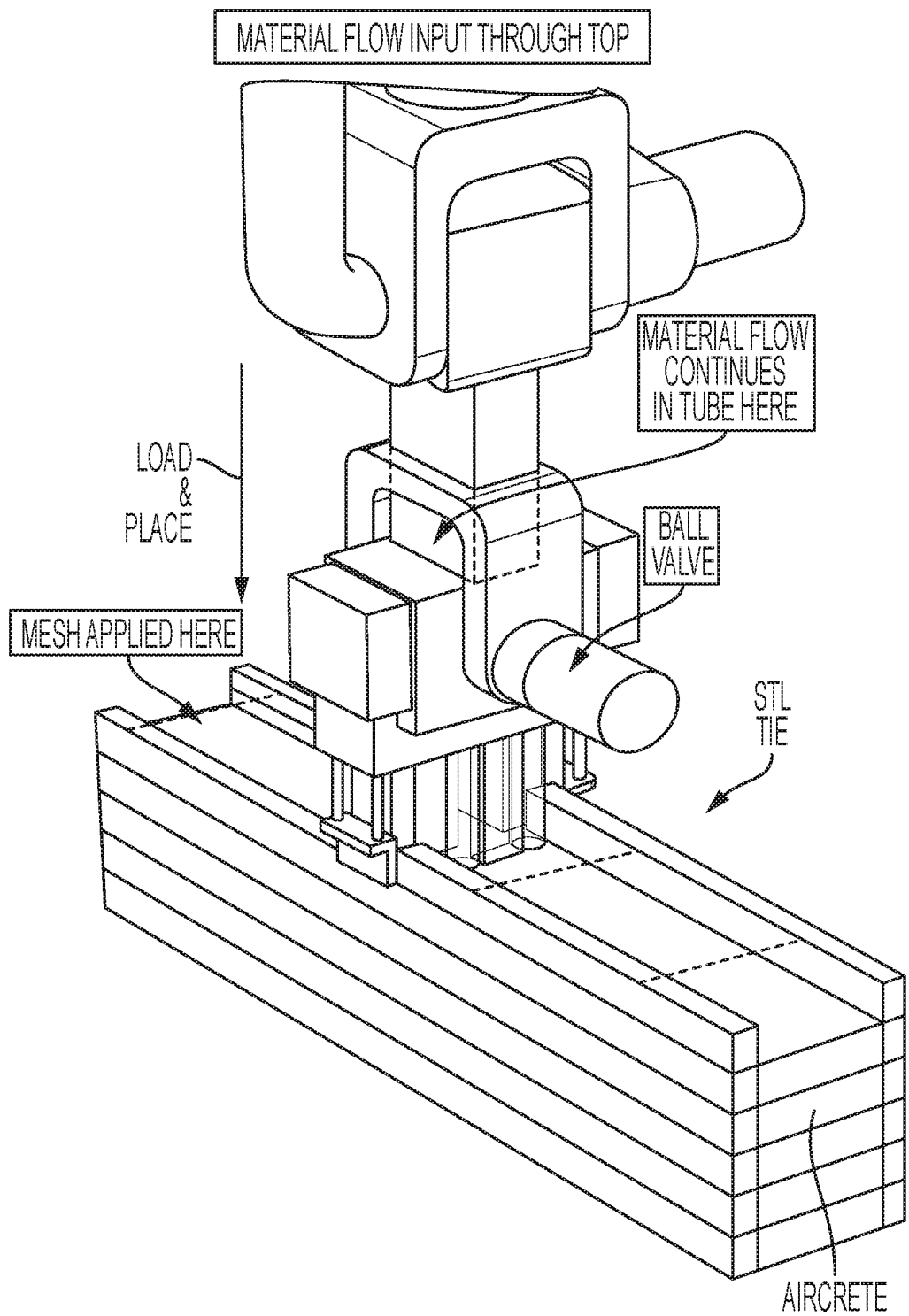
FIG. 14 illustrates another aspect of the present invention including an exemplary nozzle head design.
Figure 15:
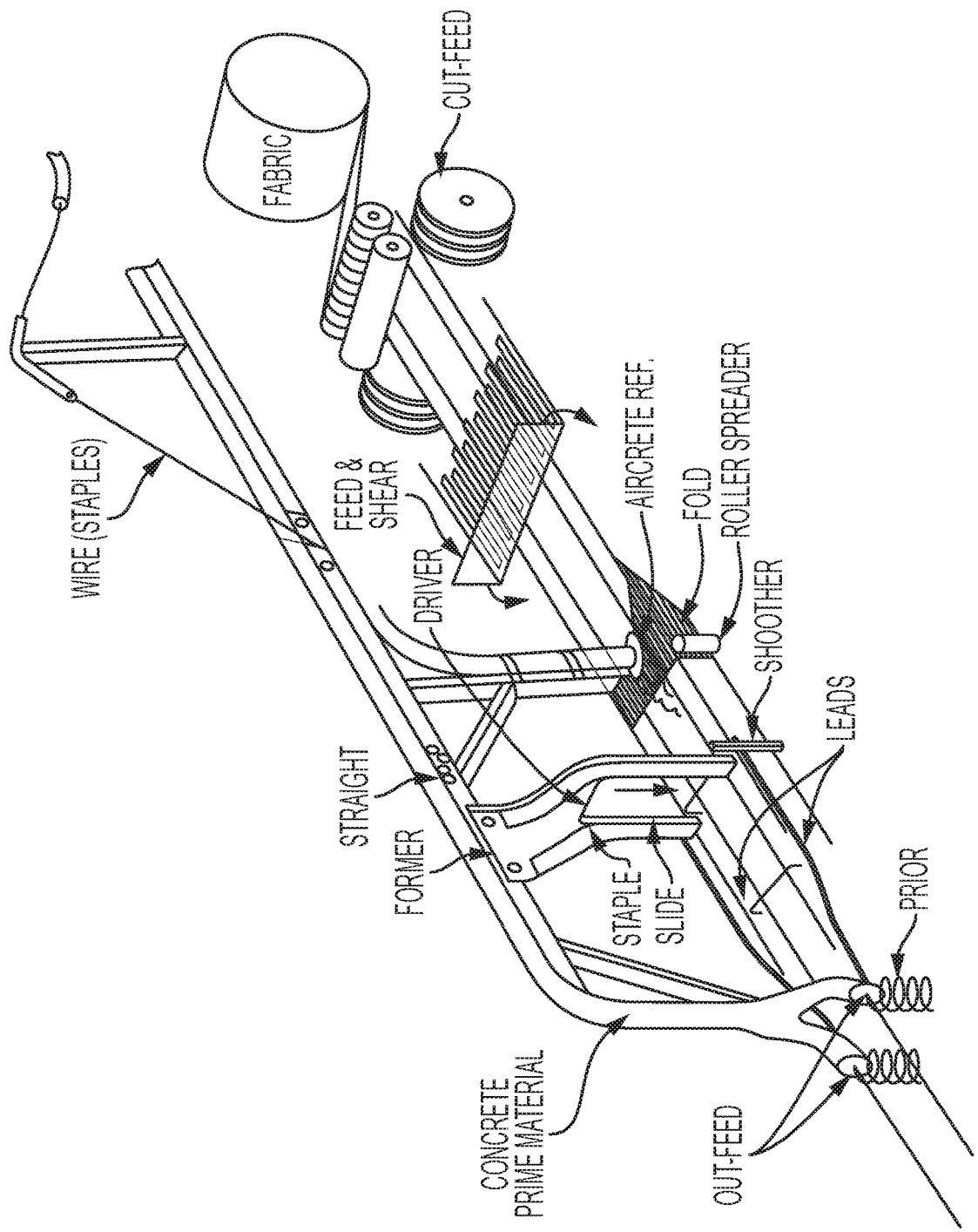
FIG. 15 illustrates another aspect of the present invention including an exemplary nozzle head design.
Figure 16:
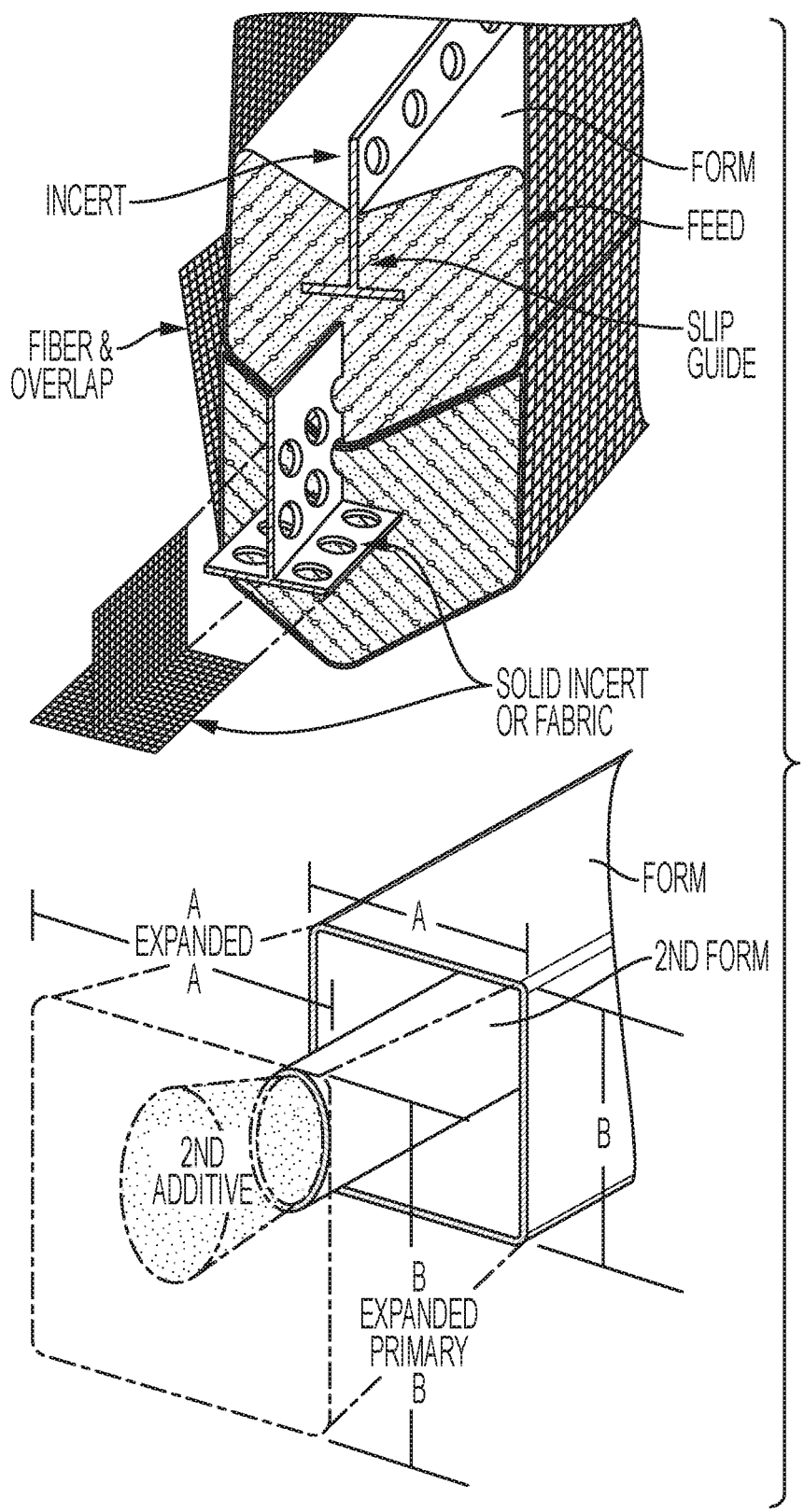
FIG. 16 illustrates another aspect of the present invention including an exemplary nozzle head design.

Applicator 108 may additionally include a driver/stapler, such as shown in FIGS. 14-15. The driver/stapler may be configured for the reinforcing material to be driven vertically into the tops of opposing layers such that the rebar staple or other reinforcing material creates an internal lateral bracing/reinforcement. A feeder runs directly in with nozzle system 300 and corresponding confluent apertures, allowing a contiguous feed of reinforcement material(s) to be integrated into material 310. Similarly, a feeder allows a contiguous feed of reinforcement material(s) to be integrated into material 312.

The mesh, strands, tapes, or other reinforcing material may include a metal, resin, and/or polymer material, or any other material capable of being rolled or formed into a flat sheet and bonding with one or more of the first and second materials. For example, the mesh material may include a Kevlar or Kevlar-like material, or any other reinforcing material appropriate for the particular application. Another example is a high density polyethylene, e.g. Denima and Spectro.

Figure 3D:
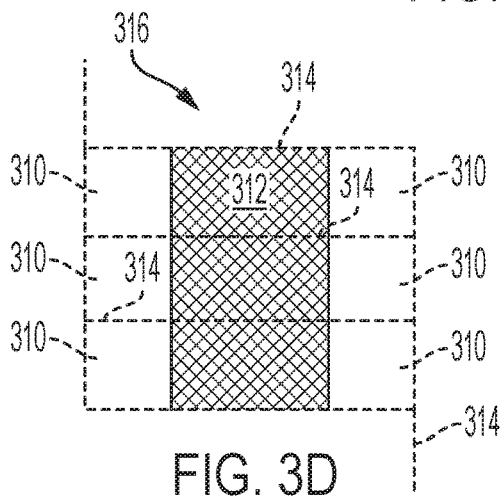
FIG. 3D illustrates another aspect of the present invention including an exemplary three-dimensionally printed structure.

FIG. 3D illustrates a schematic cross-sectional view of the structure 316 laid down by the applicator 108 shown in FIG. 3C. As shown, there are three layers of a first material 310. In between the two columns of the first material 310 is a second material 312. At the interface between the layers, there is a mesh material 314, which is also folded along the sides of the first material 310. In this embodiment, the second material (e.g., a foam material) may be structurally bonded to both sides of the first material 310 through the mesh material 314. This composite material adds insulation value, absorbs energy, and reinforces the structural stability of the structure as a whole. An exemplary material for the composite material includes a gas-entrained concrete.

Figure 3E:
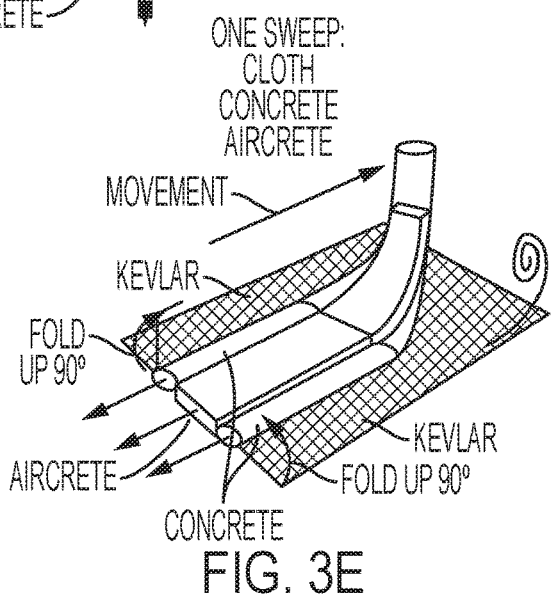
FIG. 3E illustrates another aspect of the present invention including an exemplary nozzle head design in its relation to material dispensation techniques.

FIG. 3E illustrates the process of laying down a layer of material, including a first material (as exampled, concrete) and a second material (as exampled, a gas-entrained concrete, such as AirCrete, for insulation, structural support, and mass reduction) over a flat mesh material (as exampled, Kevlar or Denima for dynamic strength). A single sweep of an applicator 108 is sufficient for laying down a single layer of each of these materials.

The embodiments of FIGS. 2A-2E and FIGS. 3A-3E are compatible with each other. That is, one or more of the first and second tubes 302, 304, and the third tube 306 may each be fitted with a nozzle head, such as the nozzle head 200. For example, first and second tubes 302 and 304 may be fitted with nozzle head 200 (e.g. with a tube 206a, 206b, 206c having an "L" bracket shape), such that the structures printed by nozzle system 300 include internal support structures similar to that shown with respect to FIGS. 2A-2E.

Another embodiment of an applicator 108 and the type of three-dimensional printed structure such an applicator 108 may construct includes the use of "socks" or sock-like structures that may be knitted together. A sock may include a concrete layer or rope retaining a shape such as, but not limited to, a square, circle, or crescent. FIG. 6B, for example, shows the weave of a square sock. A sock may be woven out of materials (and optionally entrained with chemical bonding agents such as, but not limited to polyurethanes and acrylics) such as, but not limited to, Kevlar, fiberglass, Denima, steel, or carbon. The sock may be filled with one or more materials, including a first material (e.g. concrete), causing the sock to expand. The sock may be made of a second material, such as a continuous fiber. For example, sock may be made of Kevlar. As shown, a layer of socks, when filled, may be stacked, one on top of another. Socks 402 may be generally rectangular in shape, or may have any other shape. For example, socks 402 of different layers may be shaped such that the socks interact with each other to provide increased structural stability.

FIG. 4A illustrates an example of a nozzle type placed inside of another nozzle type. As shown, wires or cables are placed inside the nozzle fitted with slots provided as feeds for wires, cables, or material strands to facilitate a feed into the surrounding material environment provided by another nozzle or head. Such wires (e.g., barbed, conductive, etc.), cables, or material strands may be used for numerous purposes, including but not limited to communications, horizontal structural support, and blast protection. For example, wires or cables could also carry information, such as from sensors inside of an enclosed structure. The wires or cables may be placed with any of the example applicators 108 described herein. For example, the nozzle head 200 described above may include a tube for laying such wires or cables, which may be part of the tube 206a, 206b, 206c, or may be an additional tube or tubes. Nozzle system 300 may also include a tube for laying such wires or cables (or other types of embedments), which may be part of tubes 302, 304, 306, or an additional tube, and such wires or cables (or other type of embedments) may be in one or more of the first material 310 or second material 312. These, too, may optionally be chemically treated and/or coated with bonding agents or reactive chemicals.

Figure 4B:
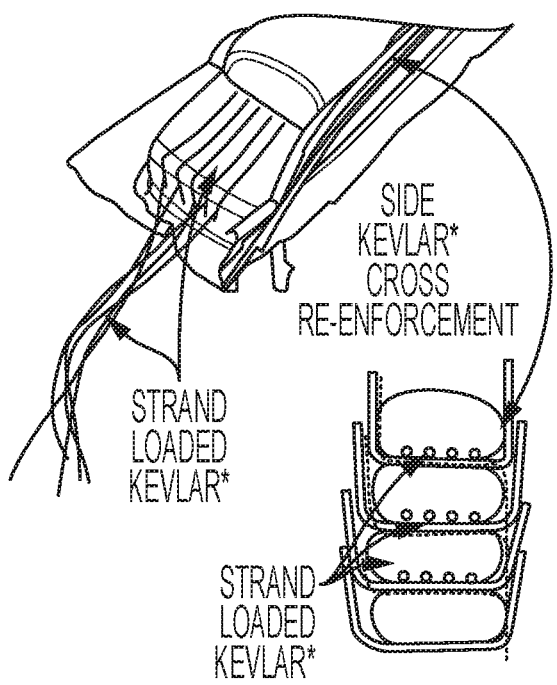
FIG. 4B illustrates another aspect of the present invention including an exemplary layer of three-dimensionally printed material embedded with structurally reinforcing fabric.
Figure 5:
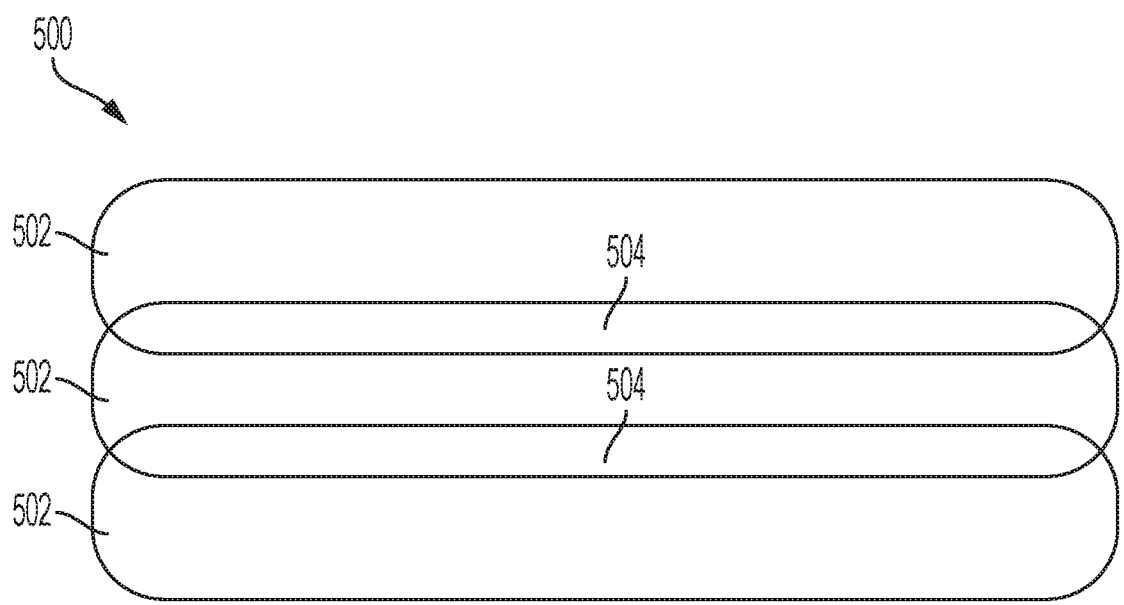
FIG. 5 illustrates a typical three-dimensionally printed structure clearly delineating the locations providing weak bonds where the layers meet.

FIG. 4B illustrates an example of a layer of material that may be laid by an applicator 108. A material such as but not limited to a side Kevlar coating/wrapping may wrap around one or more materials, such as a first material, as discussed above with regards to a fabric or mesh material 314. This Kevlar encasement may provide cross reinforcement. Additionally, strand loaded strings of material (e.g., Kevlar, steel, or Denima) may be provided inside of the first material. These strings may provide for additional reinforcement of the first material. These strings may be laid down in a similar manner to that discussed above for the wires or cables shown in FIG. 4A.

Figure 11:
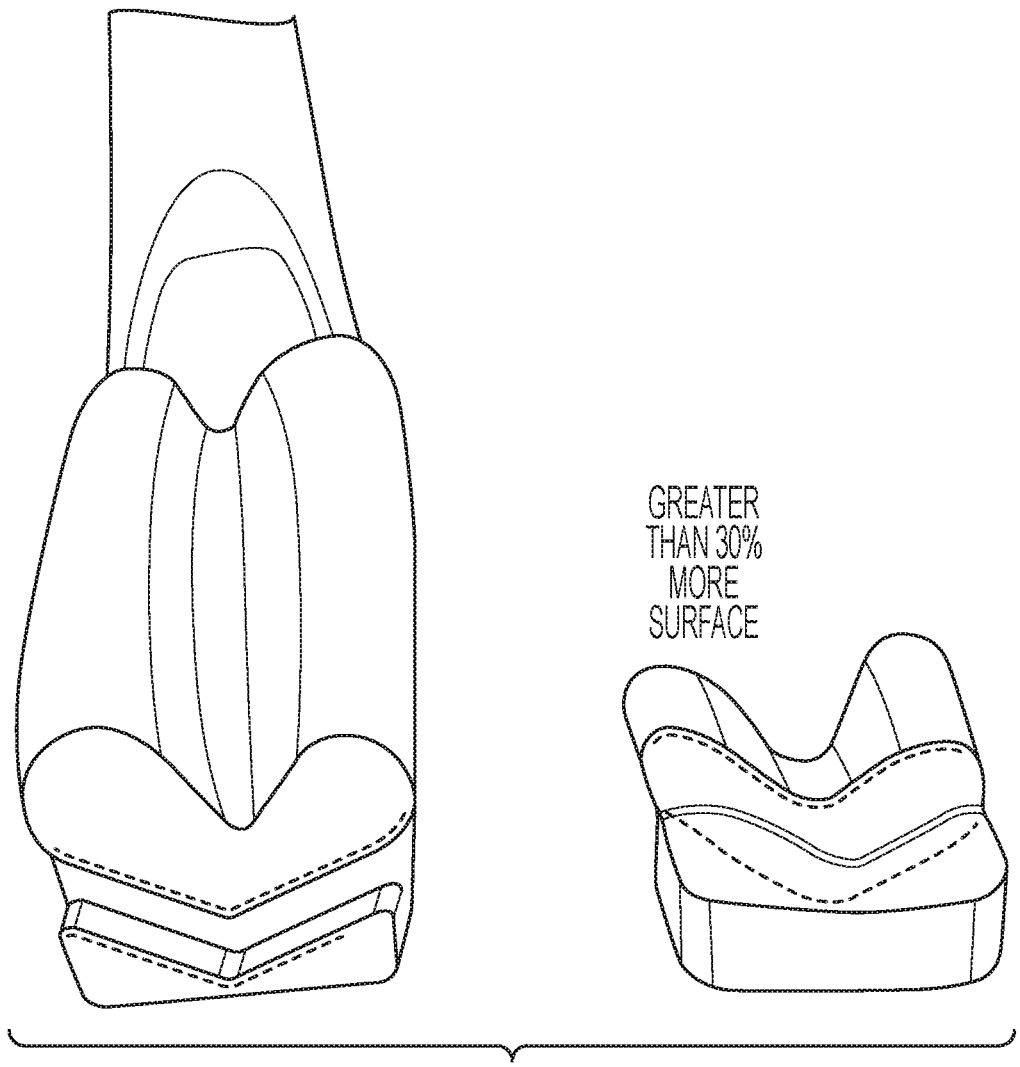
FIG. 11 illustrates another aspect of the present invention including the profile of an exemplary nozzle head design for mechanical adhesion and material layering to enhance lateral resistance and additional mechanical surface area.
Figure 12:
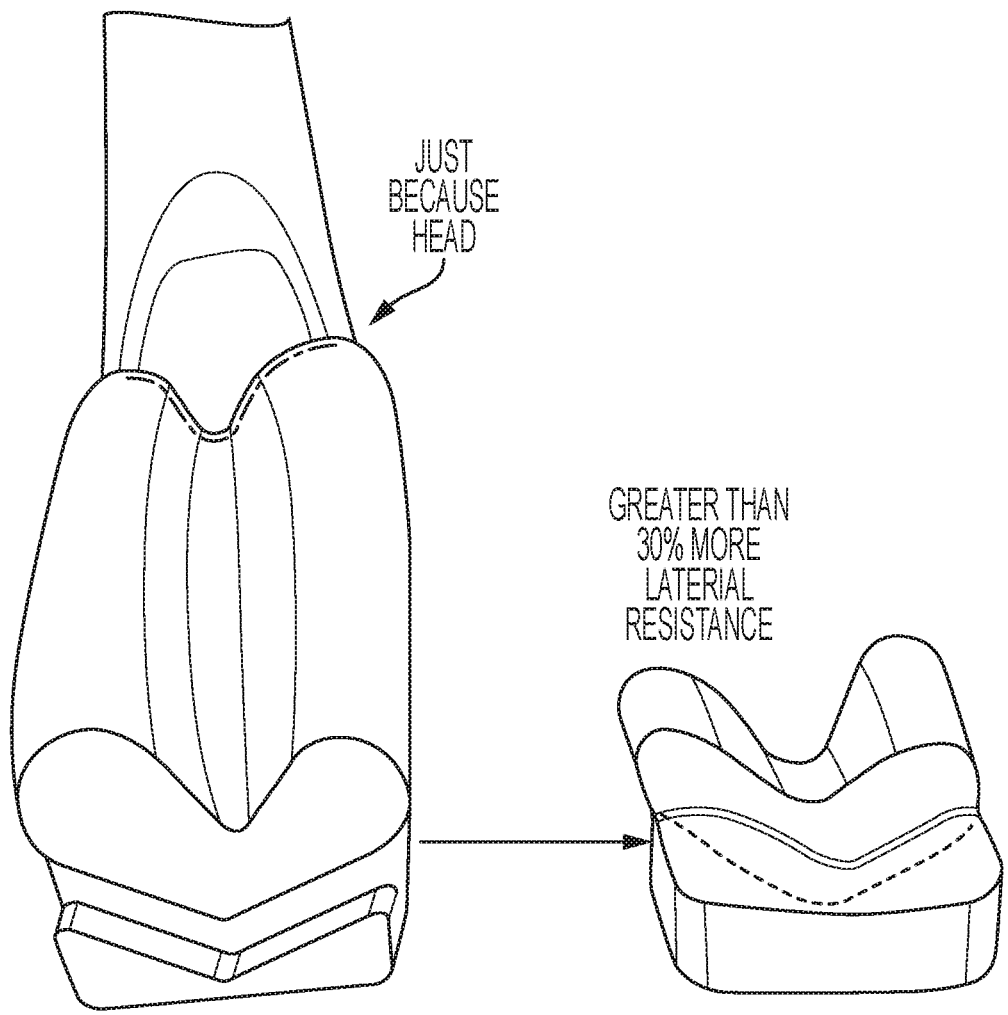
FIG. 12 illustrates another aspect of the present invention including the profile of an exemplary nozzle head design for mechanical adhesion and material layering to enhance lateral resistance and additional mechanical surface area.
Figure 13:
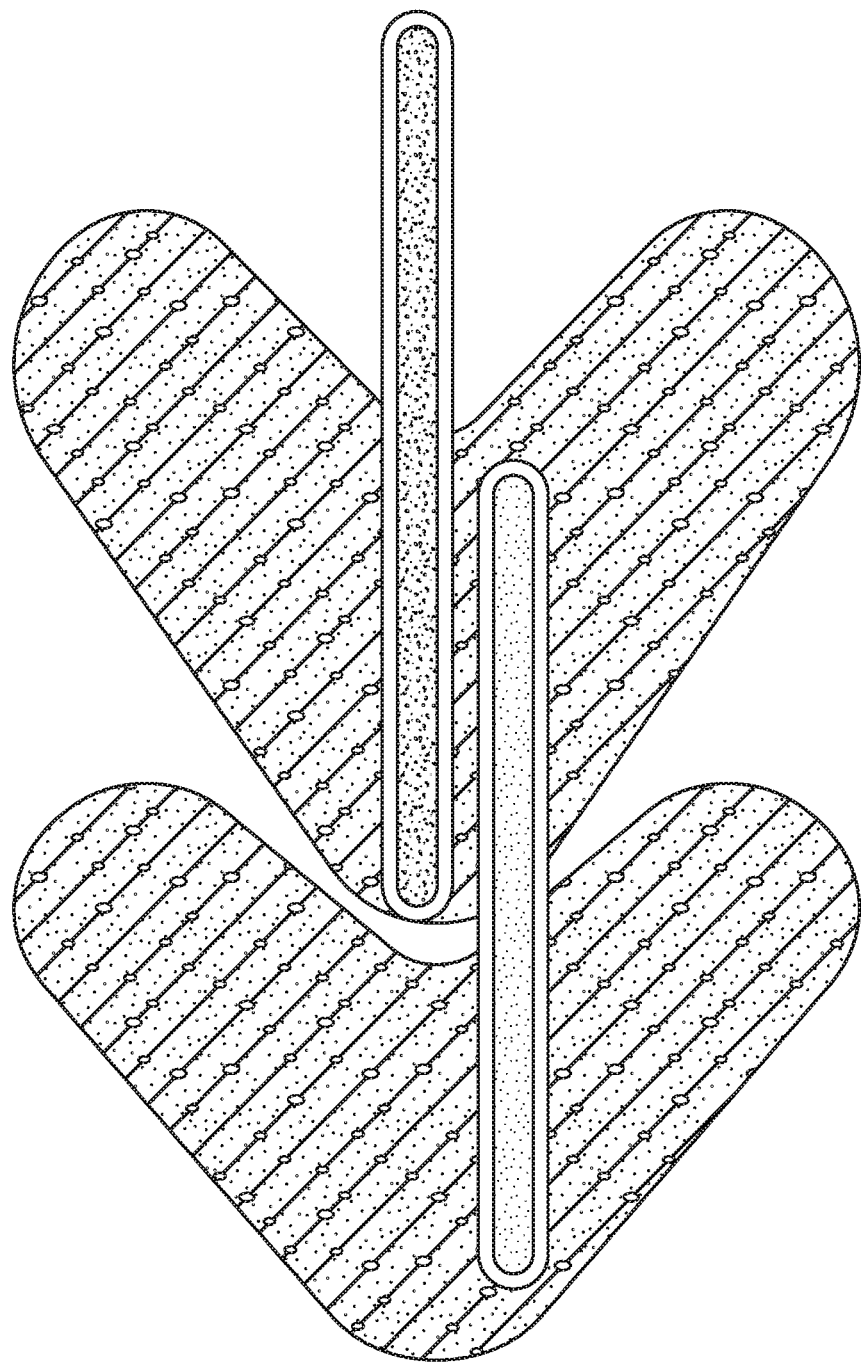
FIG. 13 illustrates another aspect of the present invention including the profile of an exemplary nozzle head design for mechanical adhesion through the insertion of rigid supports and material layering to enhance lateral resistance and additional mechanical surface area.

Different nozzle head designs allow for a wide variety of different types of applicators that can three-dimensionally print an even wider variety of structures. For example, one head design could emit material (or materials) in a "Z"-like shape, such that when one "Z" layer is emitted onto another "Z" layer it nests in the prior "Z" layer, having better contact (e.g., greater than 30% better contact than with a circular head shape), and preventing lateral movement between the layers. Other shapes, or combinations of shapes, are also possible. For example, alternating "H" and "I" layers could create an interlocking structure with improved stability. Also, a heart-shaped (e.g., as shown in FIG. 11-12) or "V"

shaped (e.g., as shown in FIG. 13) layer may be laid on top of another heart-shaped or "V" shaped layer, causing improved contact. Furthermore, a nozzle such as tube 206*b* could be placed within a "V" shaped nozzle shown which would feed a material beam into the first material (e.g., as shown in FIG. 13). There could also be alternating "I" and "O" shaped layers. Such combinations can help to improve interlocking between the layers.

Figure 7:
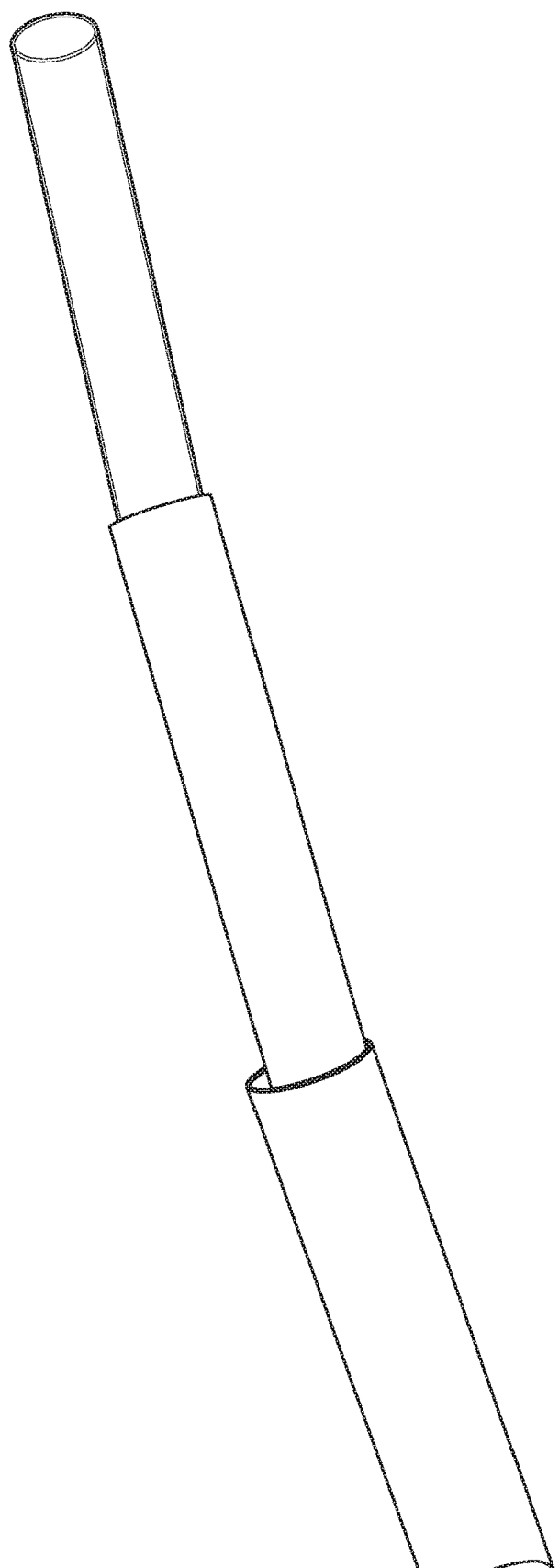
FIG. 7 illustrates another aspect of the present invention including an exemplary nozzle head design featuring a nozzle head within a nozzle head.

Another design option, compatible with any other type of head design, is for a nozzle or tube to be located concentrically within another nozzle or tube, and possibly repeating this pattern such that a plurality of nozzles or tubes are concentrically within other nozzles or tubes, such as shown in FIG. 7. A head design can also allow for emitting material in a linear or a spiral fashion.

Figure 6A:
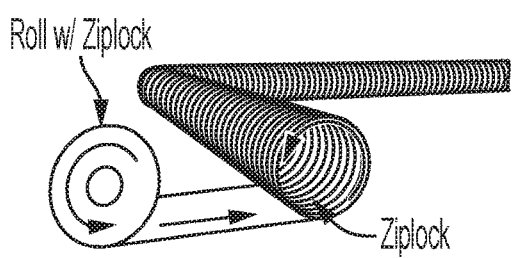
FIG. 6A illustrates another aspect of the present invention including an exemplary three-dimensionally printed structure that is spiral-reinforced and wrapped.
Figure 6B:
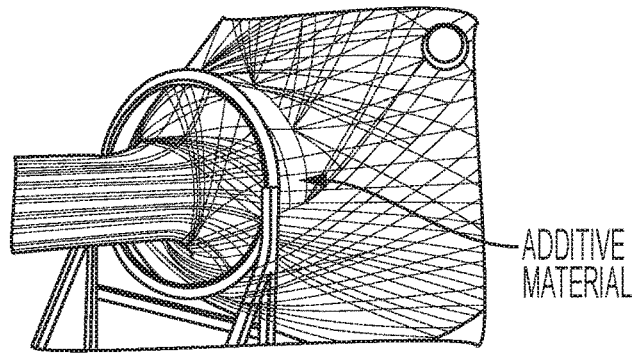
FIG. 6B illustrates another aspect of the present invention including a woven reinforced polygon cylinder applied at the point of aperture.

FIG. 6A illustrates an exemplary process design, showing a multi-axis interlocking sleeve/roll with plastic (such as a Ziplock type material). The material feed leads the progress of applicator 108 constantly locking into place a tube of material into which material 404 is extruded/printed.

FIG. 6B illustrates an exemplary process design, showing a square sock being woven by a commercial Lineal Braider. The lineal braider leads the progress of applicator 108 constantly braiding into place a sock/tube of material into which material 404 is extruded/printed.

Figure 6C:
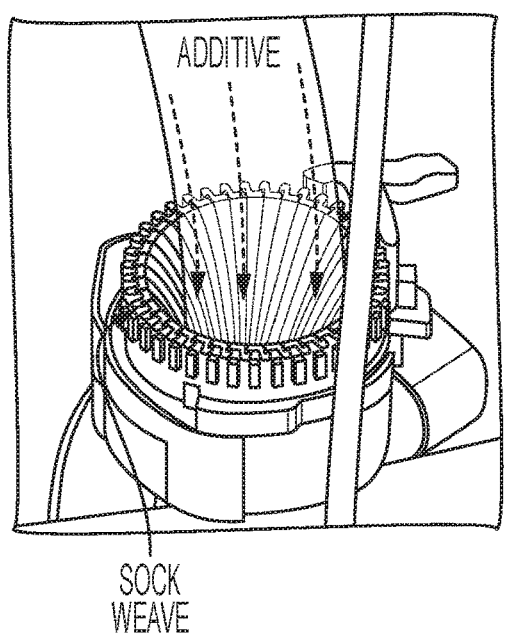
FIG. 6C illustrates another aspect of the present invention including a woven reinforced round cylinder applied at the point of aperture.

FIG. 6C illustrates an exemplary process design, showing a round sock being woven by a commercial Loop Lineal Braider. The Loop lineal braider leads the progress of applicator 108 constantly braiding into place a sock/tube of material into which material 404 is extruded/printed.

Figure 6D:
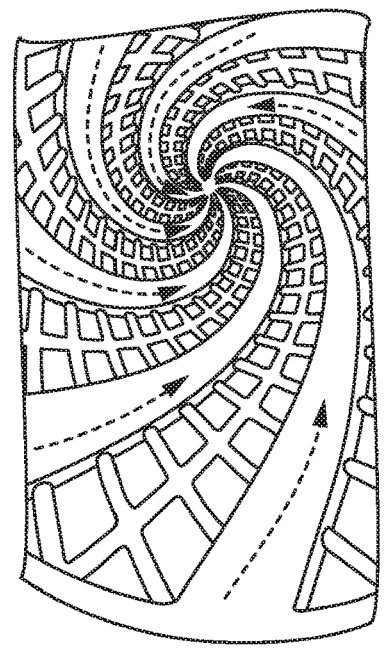
FIG. 6D illustrates another aspect of the present invention including the interior of a woven reinforced aperture.
Figure 6E:
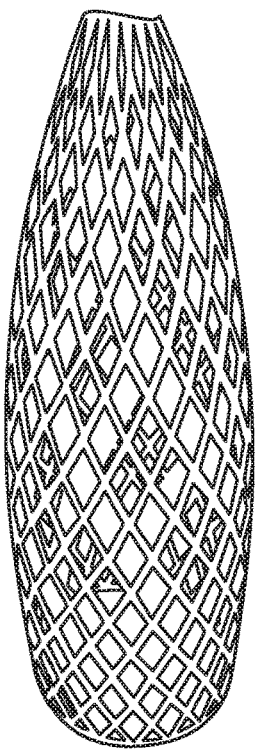
FIG. 6E illustrates another aspect of the present invention including the exterior of a woven reinforced aperture.

FIG. 6D illustrates the inside of the braid produced by a Lineal Braider providing a nozzle eye view of the path of extrusion.

Figure 8:
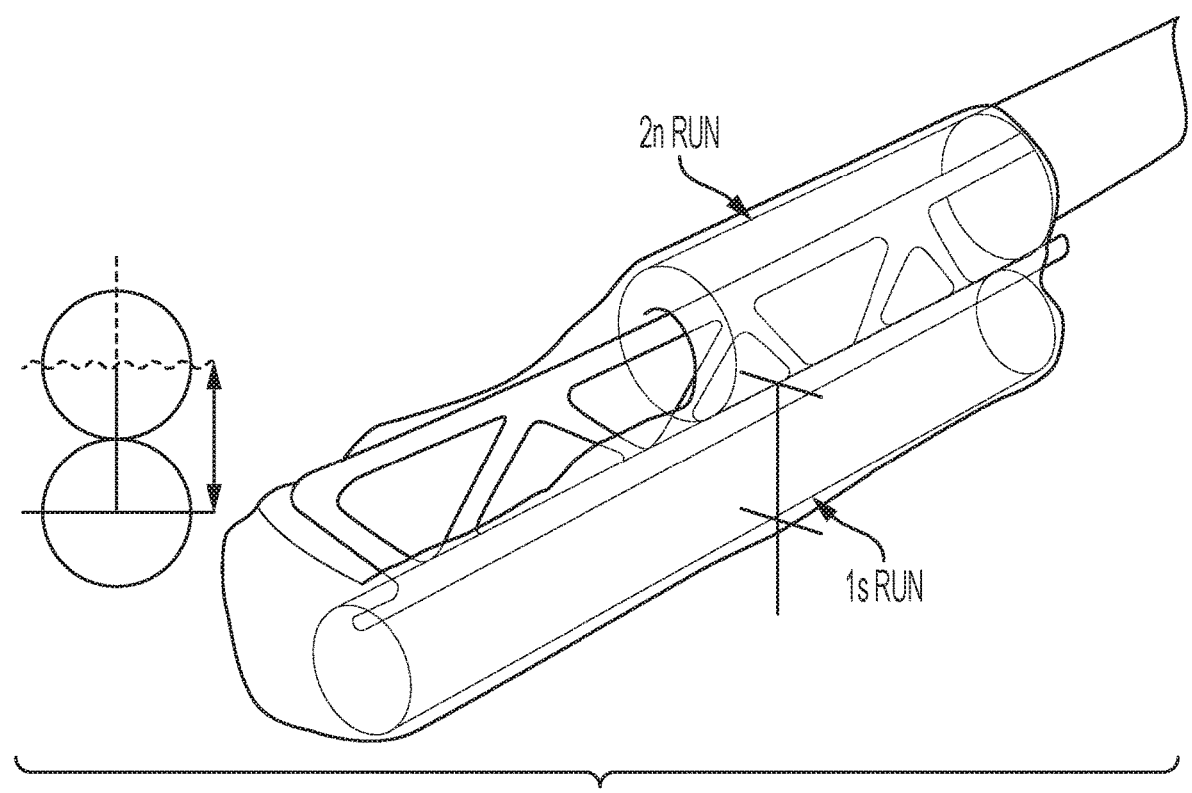
FIG. 8 illustrates another aspect of the present invention including an exemplary nozzle head design that facilitates the simultaneous placement of rigid supports and material/additive extrusion/placement and the resulting stacking/bonding of reinforcements resulting from material layering.

FIG. 8 illustrates a "fiber truss example" embodiment. The head design that emits this allows for emitting one column of material (shown as an ooze-like resin), where another structure (shown as a zig-zagged hard carbon fiber truss) is emitted as first column of material comes out. The first column of material could be any material, including but not limited to e.g. cement, plastic, metal and so on. The structure could be a zig-zagged hard carbon fiber truss, as shown, or any other structure, including strands of resin or polymer. The structure stands about 50% inside/outside of the dispensed material as shown (this percentage may vary in embodiments). As a second column of material is emitted, the second column effectively locks in top of the truss structure. Therefore, as each column (or row) of material is emitted, it is reinforced to the prior column (or row). This allows for improved integration of a prior load to a newly emitted upper load.

Figure 9:
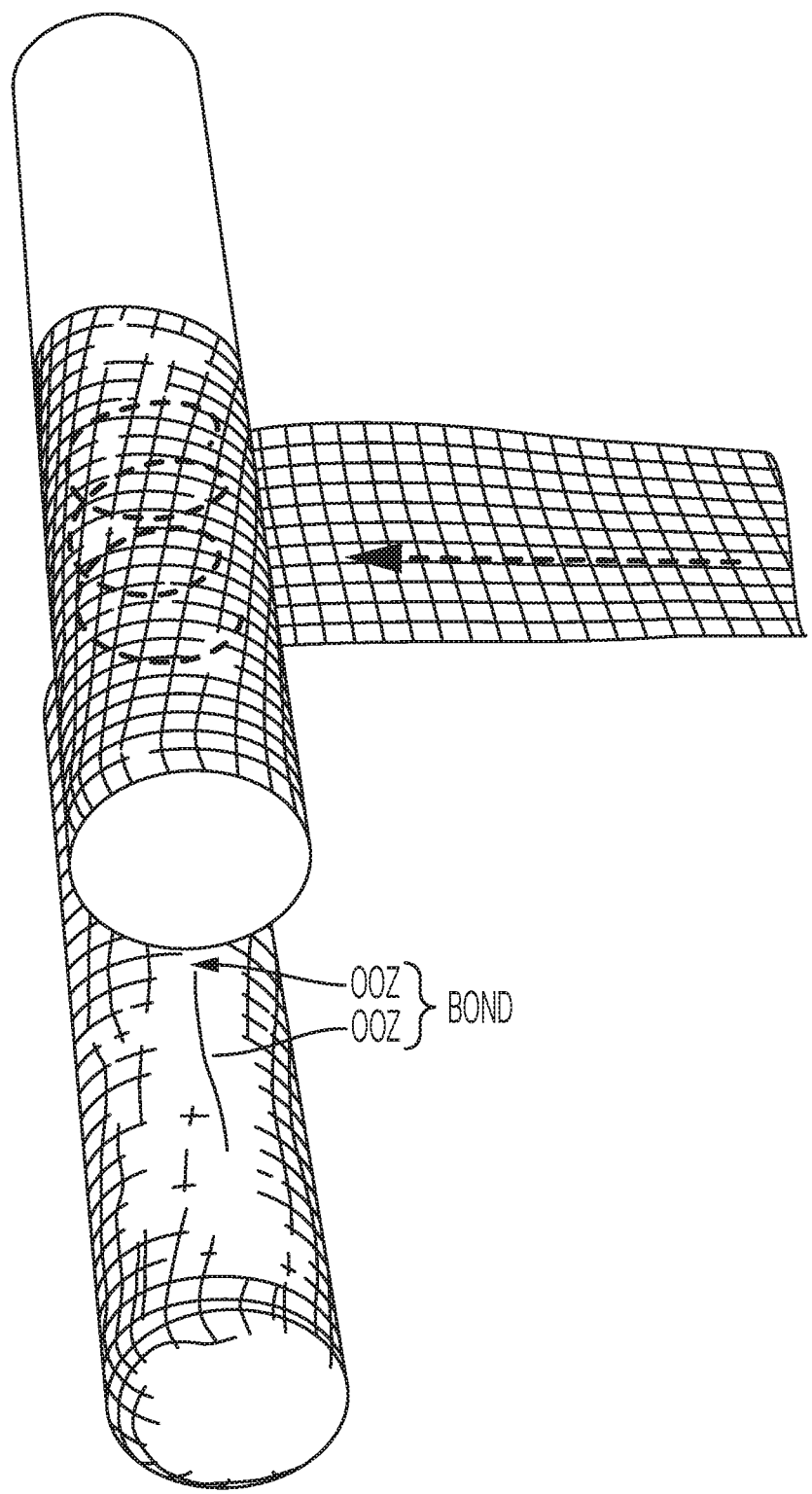
FIG. 9 illustrates another aspect of the present invention including an exemplary stacked spiral reinforcement bond.
Figure 10:
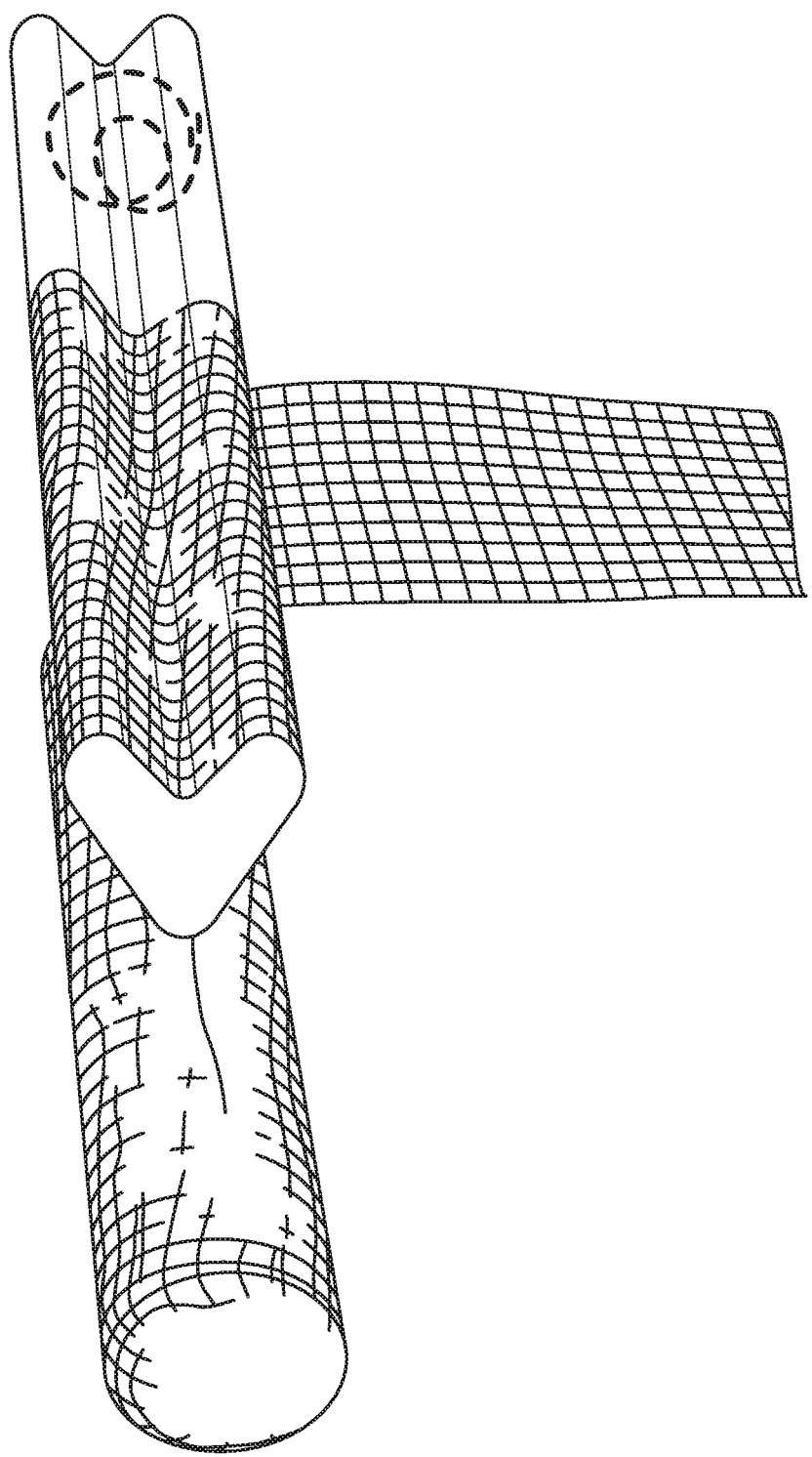
FIG. 10 illustrates another aspect of the present invention including the profile of an exemplary nozzle head design for mechanical adhesion.

FIG. 9 illustrates a "clay mesh example" embodiment. As shown, a layer of clay may have mesh wrapped around it. For example, the head that emits this structure could include a tube concentrically within another tube, and/or have a dispenser like a tape dispenser that dispenses mesh around whatever is in tube that the dispenser is around. Mesh holds the dispensed material (e.g. cement) together circumferentially, but allows enough of the material to get through mesh to bond to a prior row of material. As multiple rows (or columns) of material with mesh are laid down, they are firmly held together (e.g., cemented) but are each individually wrapped. Mesh is dispensed simultaneous with the emitted material. For example, inside the head, there may be a wheel that rolls out the mesh, e.g. two (small) walker wheels that are motorized, and rotate counter to each other, so that anything slipped between them keeps moving.

Additional embodiments also provide for a movable and/or pivotable base on which the three-dimensionally printed structure may be printed.

The current art of additive manufacturing is not competitive with traditional manufacturing due to a number of limitations. These limitations affect the utility, size, and cost of objects being created. Past approaches have attempted to address some of these limitations in isolation, but do not provide a robust method of additive manufacturing.

Embodiments provide a cost-effective production process that produces unitized objects having dimensional and performance characteristics that are not limited by the additive manufacturing process itself.

In current art, additive manufacturing has several limitations. Printed structures include cold joints. The size of a printed object is limited by the architecture of the printers' structure. Further, material efficiency is limited by the necessity of the production of supports in the process of material deposition in the creation of overhang angles greater than 45 degrees. These deficiencies are further described herein.

Cold Joints

Embodiments improve upon the cold joints of prior methods, e.g. by cross linking for improved structural stability. As explained herein, such embodiments provide internal structural stability such as cross-linking and/or dynamic or other protection.

Size Limitations

Embodiments improve upon the limitation of the objects' size in prior methods. Objects produced by additive manufacturing are typically limited in size by the architecture of the application system e.g.: dimensions of the printer frame or gantry and/or the reach of supports holding the applicator (s). To improve upon this limitation, embodiments may physically de-couple the printer base and or object being manufactured from the material deposition apparatus. The base/object and applicator, though physically separate, may still communicate and locate each other wirelessly and/or by using physical characteristics and elements of the object itself. The nature of the tracking of the object may include (but is not limited to) the different elements of the manufacturing device(s) tracking and sharing their positions in space with one another and with the object itself. Tracking elements of the applicator and the object may be accomplished by using registered waypoints and/or traceable elements embedded in or inherent to a base, and/or in the object being manufactured, and/or in various other elements of the applicator(s) themselves.

Physically de-coupling the base and/or object being manufactured frees the applicator to move, free of traditional supports. The base can be a liquid, gaseous, fluid, or solid bed, it can be a conveyor belt, it can be on wheels, or it can be stationary.

The manufactured object can be moved/manipulated in a variety of ways to bring the object into the proper proximity of the applicator if suitable approach angles are not found by the applicator. The manipulation of the object to adjust its orientation to a suitable application position may be achieved by locating the object by using both traditional X,Y,Z coordinates fixed on points on the printer base, and/or registered waypoints and/or sensors imbedded into/on the base itself and/or the object as it is produced and then coordinating aspects of the manufacturing device (elements, mechanical or otherwise, designed to move the object in whatever environment it may be in) to physically change the object's orientation to the applicator.

The "base" can also be a conveyor belt, allowing the object to be towed to great lengths. Continuous strands of material embedded into the material in some embodiments may also act as a towline/support in the printing process.

At any point in space, in a liquid, fluid or on a plane, attached or un-attached to the applicator apparatus the registering of waypoints and/or embedding of sensors/tracking elements on/into the object gives the applicator (equipped with tracking sensors and the means to embed tracking devices into/onto the object it is working on) the ability to track it's progression both traditionally (points X,Y,Z, etc.) on a base, coupled or un-coupled and also subject to the discovery of the trackable elements in/on the object being manufactured and/or the analysis/tracing or registered waypoints, and finally in/on aspects of the application device itself.

One aspect of de-coupling the base/object from the applicator is that the applicator may be equipped with sensors. Sensors that can register degrees of temperature, vibration, light, radiation, distance, density and any other aspect of the objects physicality the applicator requires to register the objects' location and orientation to the applicator.

The Overhang Limitation

Another limitation of the current art of additive manufacturing is that the additive process of layering materials (known in the three-dimensional printing industry as "additives") requires a surface to accept the material deposition. If an object being manufactured has overhangs; the current art requires the generation of support structures ("legs", "Towers", Columns", etc.) to enable the material deposition. The additional material usage adds the burdens of material inefficiency and additional labor (to remove support structures and the finish surface to desired texture) to the additive manufacturing process. As a rule of thumb, an overhang that extends at a 45-degree angle on short articles does not require any special measure to hold. At this angle, each layer is still 50% supported by the previous layer.

Since using an overhang requires the utilization of materials and labor not inherent to the core material construct of the printed structure, embodiments that remove the requirement for an overhang result in improved efficiencies in labor and material usage (e.g. up to 30% less material needed for certain structures) and the ability of the additive manufacturing process to produce items of particular geometries the current art cannot achieve both physically and economically.

Embodiments relate to the applicators' approach angle in relation to the object being produced.

Embodiments may employ a multi-axis articulated material printing surface/base/bed physically independent of the material applicator. This surface/base/bed may be provided to move the printed object in a way that presents it to the applicator head utilizing perpendicular/plumb orientation and effectuating gravity as the assist for material deposition in lieu of printed base-up supports which can thus be eliminated. The printing surface/base/beds' movement provides up/down, yaw and pitch manipulations creating an exponential increase in additional approach angles for the printer heads' deposition process. The shape of the material printing surface/base/bed can be that of a square, rectangular round, ovoid or any other shape required.

In the printing of nominal scale articles, a multi-axis articulated material printing surface/base/bed may be effective. Traditional surface adhesion (object to a base) is effective in keeping the object stationary on a base and discoverable to the printer head in relation to the bases' orientation in space to the printer head. Larger/heavier items to be produced, however, may require a mechanical attachment and/or temporary structural supports that may be incorporated in the object, such as a continuous reinforcement embedded in the object that acts like a tow line upon which the object can be manipulated; rotated, towed, tilted, etc. These manipulations move the object into positions that present in to the applicator head allowing gravity to assist once again in the material deposition process. Additionally, the utilization of linear re-enforcement fibers (used as tow lines or supports), may allow embodiments to incorporate internal and/or external co-extruded tension members in conjunction with co-molded compression structures simultaneously formed in the additive process. The essence of the science is based on the designs of nature such as in the skeleton bone in connecting muscles, tendons and fleshly body all working in concert. No one member on its own may have the ability to project beyond vertical, but together they act in concert to augment out beyond the vertical.

The objects may rest on a fixed, or a moveable base attached, or de-coupled from the applicators. It may be a multi-axis articulated base, or a moveable surface such as a liquid, gas, solid, conveyor belt, dolly or skate. In the event of moveable surface/medium the printer head may deposit tracking devices/sensors onto or into the object or base medium. Tracking devices may be registered waypoints and/or embedded in a base/s and/or in the object being manufactured as mentioned previously.

If the object being printed is in a position in which material application is not possible and the object is not attached to a base but rather is in space, in a liquid, fluid or unaffixed to a solid surface, the printer head can manipulate the object being produced, move it into a position that facilitates further material deposition, place or replace and resume the production process. The applicator is equipped with sensors that read tracking devices or sense embedded/entrained/emeshed materials or elements in/on the object that allow the applicator to gauge where the object is in space in relation to itself. The manipulation of the object to adjust its orientation suitable to effectuating an application may be achieved by locating the object by using both traditional X,Y,Z, etc. coordinates fixed on points on/in the printer base, and/or registered waypoints and/or sensors imbedded into/on the base itself and/or the object as it produced and then coordinating aspects of the manufacturing device (elements, mechanical or otherwise, designed to move the object in whatever environment it may be in) to physically change the object's orientation to the applicator.

In embodiments, the printer head(s) may extrude/place/entrain/inject/tow and otherwise facilitate the deposition of a variety of materials in multiple states such as solid, liquid, fluid and gas while also tracking the amalgum of its function in space. This tracking function allows the head(s) a freedom of movement not possible attached to a gantry, frame or arm. The means by which the applicator/printerheads' movement is facilitated is a function of the elements of the job. The applicator/heads' movement can be facilitated by wheels, tracks, propellers, arms, or any means appropriate to move the applicator and it's sensors where they need to be.

In embodiments, quality control measures may be used in a manufacturing based node server, e.g. using block chain stop-gap quality control measures. This may provide a method of coordinating production processes that coordinate and protect the customer, manufacturer, and material supplier involved in the additive production process of an object.

Additive manufacturing machines equipped with node servers and the ability to communicate with other node servers effectuate two main functions: 1) Production of an object. Stop-gap quality control measures monitored and enforced per terms of smart contract loaded into machine. 2)

Process, record and effectuate a series of smart contracts recorded on de-centralized block ledgers on a recognized de-centralized smart contract platform such as but not limited to Etherium.

Such quality control measures provide for maintenance production quality standards, provide consistent training, collect data and maintain high levels of mechanical functionality. Each of the production machines using embodiment quality control measures may be networked, having onboard computers that hash and verify transactions from the other production machines in the network and create ledgers in blocks. The blocks may be shared and verified by the network computers and a block chain certification system is effectuated. This system ensures the machines will share honest data and be able to participate in a constant quality improvement process.

When a production sequence is initiated a series of stop-gap protocols is prompted that must be addressed before the program will allow the machine to begin production.

1) Material Quality verification: The object's design will/may provide a specific or range of material specifications and process protocols. The equipment operator prior to loading the materials into the manufacturing equipment shall scan the material packaging or read a sensor that will provide information such as but not limited to: Batch & serial numbers, stock numbers physical description, and other material attributes. Once the proper amount of process approved material is scanned and loaded into the manufacturing equipment that particular stop-gap is removed.

Sensors on the manufacturing device will measure the proper amount/flow of materials (e.g.: water, air, or other materials). If the sensors are calibrated and operational; that stop-gap is removed.

2) Payment verification stop-gap option:

Payment verification corresponding to any of the functions associated with this certificate. (E.g.: Scanned material is paid for before the machine will start. This will enable consignment shops and independent fabricators to keep payments balanced for inventory accounts in real time.)

3) Quality of service monitoring and manufacturing data collection:

Information such as material usage. E.g., what batch of material was used on specific jobs? How much material was used?

Manufacturing equipment status. Sensors within the production equipment constantly monitor the progress of the material paths. Problems are pin-pointed and cross-referenced with all other machines of the same type. Equipment failure can be immediately addressed and cross referenced to highlight equipment design failures.

Job status and time of production. Jobs can be monitored in real time and customers can have very accurate and up to the minute progress reports.

4) Constant Training:

Production equipment operators must fill out checklists of quality assurance protocols and equipment maintenance checklists before production runs. This feature trains the operator while ensuring proper operation. Once the checklists are completed the stop gap is removed.

De-Centralized, block chain autonomous supply chain management and quality control may, in embodiments, proceed as follows. The process progression can be in the order presented, or it can be effectuated by one or more of its constituent parts, over time.

1) Customer places order with manufacturer.
Node server records terms of contract which may include but are not limited to product specifications including geometry and material composition, time of payment and time of delivery.
2) Manufacturer places order for materials from supplier.
Node server records terms of contract.
3) Supplier ships production material to manufacturer.
Node server records shipment.
4) Shipped material reached manufacturer and is placed into inventory.
Node server records location in warehouse, lot number, batch number, serial number and expiration date.
5) Job calls for list of specific materials to be picked from inventory. Job 'kit' is produced and all items are recorded as 'kitted'. Inventory is tracked and quantities monitored constantly.
6) Production machine maintenance: Protocols performed, list is checked off and entered into system. This removes associated stop-gap to allow machine to turn on.
Node server records entry.
7) Production equipment & sensor checklist: Sensors on the manufacturing device will measure functions such as but not limited to; the proper amount/flow of materials (e.g.: water, air, or other materials). If the sensors are calibrated and operational; that stop-gap is removed.
Node server records entry.
8) Material Quality verification: The object's design will/may provide a specific or range of material specifications and process protocols. The equipment operator prior to loading the materials into the manufacturing equipment shall scan the material packaging or read a sensor that will provide information such as but not limited to: Batch and serial numbers, stock numbers physical description, and other material attributes. Once the proper amount of process approved material is scanned and loaded into the manufacturing equipment that particular stop-gap is removed.
*Node server records correct material usage and progression of job status.*
9) Payment may be sent to materials supplier from manufacturer according to terms of smart contract. If payment is required according to terms of smart contract; payment becomes effectuating factor for a stop gap.
Node server records payment.
10) Manufacture of object is completed. Status of object recorded: e.g., Acceptable or Not Acceptable.
Node server records status.
11) Status (if quality is acceptable at final inspection) is transmitted as complete to customer. Included with notification of complete job status is a report of the entirety of the history of the build including a visual confirmation of the object/s condition.
Node server records status and may record payment from customer to manufacturer.
12) Object is sent out for delivery to customer from manufacturer.
Node server records method and terms of delivery.
13) Object is received by customer and scanned into database as received.
Node server records status.
14) Payment may be sent per terms of smart contract
Node server records status.

CONCISE DESCRIPTION OF SOME EMBODIMENTS

A1. A three-dimensionally printed structure comprising:
a first layer composed at least in part of a first material;
a second layer composed at least in part of the first material, the second layer being positioned over, under, or through the first layer and having an interface with the first layer;

a first internal structure composed at least in part of a second material different from the first material, the first internal structure being situated in both the first layer and the second layer.

A1a. The three-dimensionally printed structure of claim A1, wherein the first internal structure is further composed of additional materials different from the second material.

A2. The three-dimensionally printed structure of embodiment A1, wherein the first internal structure has a shape that is one of: a flat shape, a curved shape, an inverted "T" shape, an "H" shape.

A3. The three-dimensionally printed structure of any one of embodiments A1-A2, further comprising:

a second internal structure composed at least in part of the second material different from the first material, the second internal structure being situated in both the first layer and the second layer.

A4. The three-dimensionally printed structure of embodiment A3, wherein the second internal structure and the first internal structure overlap.

A5. The three-dimensionally printed structure of embodiment A3, wherein the second internal structure and the first internal structure do not overlap.

A6. The three-dimensionally printed structure of any one of embodiments A1-A5, further comprising:

additional layers composed at least in part of the first material and being stacked over the first and second layers; and additional internal structures composed at least in part of the second material different from the first material, each of the additional internal structures being situated in two or more layers selected from one or more of the additional layers and the first and second layers.

A7. The three-dimensionally printed structure of embodiment A6, wherein each layer of the additional layers includes one of the additional internal structures is situated in the layer.

A8. The three-dimensionally printed structure of embodiment A6, wherein at least one layer of the additional layers does not include one of the additional internal structures situated in the at least one layer.

A9. The three-dimensionally printed structure of any one of embodiments A1-A8, wherein the first layer comprises wires or cables suitable for communication.

A10. The three-dimensionally printed structure of any one of embodiments A1-A9, wherein the first layer comprises a continuous embedment.

A10a. The three-dimensionally printed structure of embodiments A10, wherein the continuous embedment is for reinforcement of the first layer.

A10b. The three-dimensionally printed structure of any one of embodiments A10 and A10a, wherein the continuous embedment comprises fiber strands.

B1. An applicator for printing a three-dimensionally printed structure, the applicator comprising:

a nozzle head having first and second areas for extruding a first material;

the nozzle head further having a tube for feeding a second material, such that the second material that is fed through the tube forms an internal structure to the first material.

B2. The applicator of embodiment B1, wherein the tube has a shape that is one of: a flat shape, a curved shape, an inverted "T" shape, an "H" shape.

B3. The applicator of any one of embodiments B1-132, wherein the tube for feeding the second material is located between the first and second areas.

C1. A method for printing a three-dimensionally printed structure, the method comprising:

laying down one or more layers of material, wherein laying down a layer comprises (i) extruding a first material through first and second areas of a nozzle head; and (ii) feeding a second material through a tube of the nozzle head, wherein the second material forms an internal structure to the first material.

C2. The method of embodiment C1, wherein the tube has a shape that is one of: a flat shape, a curved shape, an inverted "T" shape, an "H" shape.

C3. The method of any one of embodiments C1-C2, further comprising:

checking the first material and/or second material prior to laying down one or more layers of material, wherein checking the first material and/or second material includes (i) scanning the first material and/or second material to produce material information, and (2) comparing the material information with a stored object design plan.

C4. The method of any one of embodiments C1-C3, further comprising:

verifying payment prior to laying down one or more layers of material.

C5. The method of any one of embodiments C1-C4, further comprising:

logging material usage information after laying down one or more layers of material.

C6. The method of any one of embodiments C1-05, further comprising:

requiring an operator to submit a quality assurance checklist prior to laying down one or more layers of material.

D1. A three-dimensionally printed structure comprising:

a first layer having first and second columns composed at least in part of a first material with a second material being interspersed between the first and second columns of the first layer;

a second layer having first and second columns composed at least in part of the first material with the second material being interspersed between the first and second columns of the second layer, the second layer being positioned over the first layer and having an interface with the first layer;

a mesh structure extending between the first layer and the second layer and from the first column to the second column.

D2. The three-dimensionally printed structure of embodiment D1, wherein the mesh structure extends along sides of the first and second column.

D3. The three-dimensionally printed structure of any one of embodiments A1-A2, wherein the first material comprises concrete, the second material comprises a foam, and the mesh structure comprises a metal.

E1. An applicator for printing a three-dimensionally printed structure, the applicator comprising:

a nozzle system having first, second, and third tubes, the first and second tubes being configured to emit a first material and the third tube being configured to emit a second material;

a mesh dispenser; and a roller for flattening out mesh material dispensed by the mesh dispenser.

E2. The applicator of embodiment E1, wherein the first and second tubes bifurcate from a common tube, and wherein the third tube is positioned in between the first and second tubes such that the second material is configured to be emitted between the first material.

E3. The applicator of any one of embodiments E1-E2, wherein the mesh dispenser includes a roll of mesh material that is configured to unroll as the nozzle system is moved in a direction of printing/extruding along a printing surface.

E4. The applicator of any one of embodiments E1-E3, wherein the roller is configured to fold the mesh material as it is dispensed.

F1. A method for printing a three-dimensionally printed structure, the method comprising:
laying down one or more layers of material, wherein laying down a layer comprises (i) extruding a first material through first and second areas of a nozzle head; and (ii) feeding a second material through a tube of the nozzle head, wherein the second material forms an internal structure to the first material.

F2. The method of embodiment F1, further comprising:
checking the first material and/or second material prior to laying down one or more layers of material, wherein checking the first material and/or second material includes (i) scanning the first material and/or second material to produce material information, and (2) comparing the material information with a stored object design plan.

F3. The method of any one of embodiments F1-F2, further comprising:
verifying payment prior to laying down one or more layers of material.

F4. The method of any one of embodiments F1-F3, further comprising:
logging material usage information after laying down one or more layers of material.

F5. The method of any one of embodiments F1-F4, further comprising:
requiring an operator to submit a quality assurance checklist prior to laying down one or more layers of material.

G1. A three-dimensionally printed structure comprising:
a first layer comprising a first expandable sock filled with a first material; and
a second layer comprising a second expandable sock filled with the first material, the second layer being positioned over the first layer and having an interface with the first layer.

H1. An applicator for printing a three-dimensionally printed structure, the applicator comprising:
an expandable sock dispenser for dispensing an expandable sock to be filled with a first material; and
a nozzle configured to fill expandable socks dispensed by the expandable sock dispenser.

I1. A method for printing a three-dimensionally printed structure, the method comprising:
applying a first layer comprising a first expandable sock filled with a first material; and
applying a second layer comprising a second expandable sock filled with the first material, the second layer being positioned over the first layer and having an interface with the first layer.

J1. A system for printing a three-dimensionally printed structure, the system comprising:
a printing device having a base, an arm, and an applicator;
a material supply coupled to the printing device;
wherein the arm is capable of moving the applicator, and wherein the applicator is an applicator according to any one of embodiments B1-133, E1-E4, and H1.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for printing a three-dimensionally printed structure, the method comprising:
laying down at least two layers of material including a first layer and a second layer, wherein laying down a layer, for each of the at least two layers of material, comprises (i) extruding a first material through first and second areas of a nozzle head; and (ii) feeding a second material through a tube of the nozzle head, wherein the second material forms an internal structure to the first material, the internal structure being situated in more than one layer such that the internal structure formed laying down the first layer is situated in both the first layer and the second layer;
wherein laying down a layer further comprises dispensing a reinforcing material as the nozzle head is moved, such that the reinforcing material is wider than the width of the layer of material being laid down by the nozzle head, so that the reinforcing material extends beyond the width of the material being laid down;
wherein the method further comprises driving the reinforcing material into opposing layers.

2. The method of claim 1, wherein the tube has a shape that is one of: a curved shape, an inverted "T" shape, an "H" shape.

3. The method of claim 1, wherein laying down a layer further comprises inserting a needle into one or more of the first material and second material and introducing gas into the three-dimensionally printed structure through the needle.

4. The method of claim 1, further comprising: embedding one or more information elements into the three-dimensionally printed structure; receiving input from the one or more information elements embedded into the three-dimensionally printed structure; and manipulating the three-dimensionally printed structured based on the input received from the one or more information elements.

5. The method of claim 1, further comprising embedding one or more information elements into the three-dimensionally printed structure and receiving input from the one or more information elements embedded into the three-dimensionally printed structure.

6. The method of claim 1, further comprising: providing a sock/tube of material into which the first material is extruded and the second material is fed by the nozzle head.

7. The method of claim 1, wherein the nozzle head comprises a further nozzle head within the nozzle head.

* * * * *